US007309861B2

(12) United States Patent
Brown et al.

(10) Patent No.: US 7,309,861 B2
(45) Date of Patent: Dec. 18, 2007

(54) MASS SPECTROMETER

(75) Inventors: Jeffery Mark Brown, Cheshire (GB); Robert Harold Bateman, Cheshire (GB)

(73) Assignee: Micromass UK Limited (GB)

( * ) Notice: Subject to any disclaimer, the term of this patent is extended or adjusted under 35 U.S.C. 154(b) by 338 days.

(21) Appl. No.: 10/513,378

(22) PCT Filed: Sep. 3, 2003

(86) PCT No.: PCT/GB03/03813

§ 371 (c)(1),
(2), (4) Date: Aug. 4, 2005

(87) PCT Pub. No.: WO2004/023516

PCT Pub. Date: Mar. 18, 2004

(65) Prior Publication Data

US 2006/0076484 A1 Apr. 13, 2006

Related U.S. Application Data

(60) Provisional application No. 60/427,557, filed on Nov. 20, 2002.

(30) Foreign Application Priority Data

Sep. 3, 2002 (GB) ................................ 0220450.1

(51) Int. Cl.
*H01J 49/26* (2006.01)
*B01D 59/44* (2006.01)

(52) U.S. Cl. ...................... 250/290; 250/292; 250/286; 250/281; 250/282

(58) Field of Classification Search ..................... None
See application file for complete search history.

(56) References Cited

U.S. PATENT DOCUMENTS

| | | | | |
|---|---|---|---|---|
| 2003/0136905 A1 | 7/2003 | Franzen et al. | ............. | 250/292 |
| 2006/0163473 A1* | 7/2006 | Vestal | ........................ | 250/291 |

FOREIGN PATENT DOCUMENTS

| | | |
|---|---|---|
| GB | 2 147 140 | 5/1985 |
| GB | 2 241 821 | 9/1991 |
| GB | 2 389 452 | 12/2003 |
| GB | 2 389 705 | 12/2003 |
| WO | WO 00/08455 | 2/2000 |
| WO | WO 01/93306 | 12/2001 |

OTHER PUBLICATIONS

Blauth E. W: "Dynamic mass spectrometers" Elsevier, Amsterdam XP002265934, 1966.

* cited by examiner

*Primary Examiner*—Nikita Wells
(74) *Attorney, Agent, or Firm*—Jamie H. Rose; Anthony J. Janiuk

(57) ABSTRACT

A mass spectrometer is disclosed comprising a guide wire ion guide 1 having an outer cylindrical electrode 2 and an inner guide wire electrode 3. AC and DC potential differences are maintained between the outer electrode 2 and the inner electrode 3 so that ions are radially confined within the ion guide 1 in an annular potential well. The outer electrode 2 may be segmented and axial potential wells created along the length of the ion guide 1 may be translated along the length of the ion guide 1 by applying additional transient DC potentials to the segments forming the outer electrode 2.

96 Claims, 6 Drawing Sheets

MASS SPECTROMETER

CROSS REFERENCE TO RELATED APPLICATIONS

This application claims priority from United Kingdom patent application GB-0220450.1 filed 3 Sep. 2002 and U.S. Provisional Application 60/427,557 filed 20 Nov. 2002. The contents of these applications are incorporated herein by reference.

FIELD OF THE INVENTION

The present invention relates to a mass spectrometer and a method of mass spectrometry.

BACKGROUND OF THE INVENTION

Ion guides are known which are used to transport ions between different regions in a mass spectrometer. For example, an ion guide may be used to transport ions from or to an ion source, collision cell, mass analyser or between regions having different gas pressures. Ion guides may also be used as gas cells to collisionally cool or heat continuous beams or packets of ions by colliding the ions with a gas. Collisional cooling reduces the average kinetic energy of the ions which is advantageous, for example, for subsequent mass analysis of the ions using a Time of Flight ("TOF") mass analyser. Alternatively, ions may be collisionally heated within an ion guide during transportation between two regions so as to cause the ions to fragment. The product, daughter or fragment ions may be mass analysed in order to determine the chemical structure of the associated parent ions.

Conventional ion guides may comprise a multipole parallel rod set of electrodes e.g. a quadrupole, hexapole or higher order rod set or a stacked concentric circular ring set of electrodes (i.e. an "ion tunnel" ion guide) comprising a plurality of electrodes having apertures through which ions are transmitted in use. AC or RF voltages are applied to opposing rods in a multipole rod set or to alternate rings in an ion tunnel ion guide such that the voltages applied to the opposing rods or alternate rings have opposite phases. The geometries of the electrodes in a multipole rod set or a ring set ion guide are arranged so that inhomogeneous AC/RF electric fields generate pseudo-potential wells or channels within the ion guide. The ions are preferably confined in these potential wells and are guided through the ion guide.

A significant issue with multipole rod set ion guides such as quadrupole, hexapole or octopole rod sets is that they are relatively complex arrangements and hence are comparatively expensive to manufacture. The complexity and expense becomes a particularly significant problem if the multipole rod set ion guide is intended to transport ions over a relatively long distance.

Another known form of ion guide is an Electrostatic Particle Guide ("EPG") which comprises a cylindrical electrode having a guide wire running along the central axis of the cylinder. Different static DC voltages may be applied to the guide wire and the conductive outer cylindrical electrode so that, for example, the guide wire may be connected to a DC potential which attracts ions and the outer cylindrical electrode may be connected to a DC potential which repels ions. Injected ions will follow elliptical paths around the guide wire under conditions of high vacuum otherwise the velocity of the ions would be dampened by collisions with gas molecules and the ions would discharge upon hitting the guide wire. The potential difference between the guide wire and the outer cylindrical electrode generates a steep logarithmic potential well within the ion guide with the centre of the potential well being located at the guide wire. The guide wire may, for positively charged ions, be at a lower potential than the outer cylindrical electrode so that positive ions are attracted radially inwards towards the guide wire electrode. Negatively charged ions within the electrostatic particle guide will be attracted towards the outer cylindrical electrode and will be lost. Alternatively, the guide wire may be maintained at a higher potential relative to the outer cylindrical electrode so that negative ions are attracted radially inwards towards the guide wire and positively charged ions are repelled.

Some of the positive or negative ions which are attracted to the guide wire enter into stable orbits about the guide wire along the length of the ion guide. However, other ions will strike the guide wire and will be lost. The transmission losses due to ion collisions with the guide wire will depend upon the radius of the guide wire and the energy and spatial distribution of ions entering the guide wire ion guide. Significant transmission losses will occur when ions have kinetic energies in the radial direction which are greater than the depth of the potential well within the cylindrical electrode. These energetic ions will tend to strike the inner surface of the cylindrical electrode and will become neutralised and lost. Further significant transmission losses are also observed if the conventional guide wire ion guide is operated at relatively high pressures. At higher pressures the mean free path between collisions between ions and neutral gas molecules is significantly shorter than the length of the guide wire ion guide and hence the ions will tend to collide with the gas molecules many times before leaving the ion guide. These collisions cause the ions to lose kinetic energy which results in the ions spiraling into the guide wire and thus being lost.

In view of the above mentioned problems, known guide wire ion guides are only used to transport ions through regions of relatively low gas pressure wherein collisions between ions and gas molecules are unlikely.

It is therefore desired to provide an improved guide wire ion guide and in particular a guide wire ion guide which is suitable for use at relatively high pressures.

SUMMARY OF THE INVENTION

According to an aspect of the present invention there is provided a mass spectrometer comprising an ion guide having an outer electrode and an inner electrode disposed within the outer electrode. In use the inner and outer electrodes are maintained at a DC potential difference such that ions experience a first radial force towards the inner electrode. An AC or RF voltage is also applied to the inner and/or the outer electrodes so that ions experience a second radial force towards the outer electrode.

In a preferred embodiment the AC or RF voltage is a single phase AC or RF voltage applied to the inner or outer electrode. Alternatively, the AC or RF voltage may comprise a two phase AC or RF voltage wherein a first phase is applied to the inner electrode and a second opposite phase is applied to the outer electrode. Preferably, the AC or RF voltage has a frequency of <100 kHz, 100-200 kHz, 200-300 kHz, 300-400 kHz, 400-500 kHz, 0.5-1.0 MHz, 1.0-1.5 MHz, 1.5-2.0 MHz, 2.0-2.5 MHz, 2.5-3.0 MHz, 3.0-3.5 MHz, 3.5-4.0 MHz, 4.0-4.5 MHz, 4.5-5.0 MHz, 5.0-5.5 MHz, 5.5-6.0 MHz, 6.0-6.5 MHz, 6.5-7.0 MHz, 7.0-7.5 MHz, 7.5-8.0 MHz, 8.0-8.5 MHz, 8.5-9.0 MHz, 9.0-9.5

MHz, 9.5-10.0 MHz or >10.0 MHz. The amplitude of the AC or RF voltage is preferably <50 V peak to peak, 50-100 V peak to peak, 100-150 V peak to peak, 150-200 V peak to peak, 200-300 V peak to peak, 300-400 V peak to peak, 400-500 V peak to peak, 500-600 V peak to peak, 600-700 V peak to peak, 700-800 V peak to peak, 800-900 V peak to peak, 900-1000 V peak to peak, 1000-1100 V peak to peak, 1100-1200 V peak to peak, 1200-1300 V peak to peak, 1300-1400 V peak to peak, 1400-1500 V peak to peak or >1500 V peak to peak.

In one embodiment the timing of pulses of ions being directed into the ion guide may be phase locked as synchronised with the AC/RF voltages applied to the electrodes. Ions may, for example, be arranged to enter the ion guide according to the preferred embodiment as the AC/RF voltage passes through zero. Alternatively, the phase may be locked so that the Ac or RF voltage is not passing through zero as the ions enter the ion guide. For example, the AC/RF voltage may be arranged such that when ions enter the preferred ion guide the AC/RF electric field has a magnitude which creates a relatively large force on the ions in a direction towards the outer electrode. In this manner ions which initially enter the ion guide at an angle towards the inner electrode will not travel too close to the inner electrode and hence will not substantially pick up as much radial kinetic energy from the AC/RF electric field. Accordingly, ions initially travelling towards the inner electrode will be more stable in the ion guide and hence will be more likely to be transmitted from the entrance to the exit of the ion guide.

Preferably, the outer or inner electrode is maintained, in use, at a DC potential <−500 V, −500 to −400 V, −400 to −300 V, −300 to −200 V, −200 to −100 V, −100 to −75 V, −75 to −50 V, −50 to −25 V, −25 to 0V, 0V, 0-25 V, 25-50 V, 50-75 V, 75-100 V, 100-200 V, 200-300 V, 300-400 V, 400-500 V or >500 V. The DC potential difference between the outer electrode and the inner electrode may be maintained, in use, at a potential difference 0.1-5 V, 5-10 V, 10-15 V, 15-20 V, 20-25 V, 25-30 V, 30-40 V, 40-50 V, and >50 V, −0.1 to −5 V, −5 to −10 V, −10 to −15 V, −15 to −20 V, −20 to −25 V, −25 to −30 V, −30 to −40 V, −40 to −50 V or <−50 V.

In a preferred embodiment the inner electrode comprises a guide wire. At least 10%, 20%, 30%, 40%, 50%, 60%, 70%, 80%, 90%, 95% or 100% of the inner electrode may comprise a semiconductor or resistive wire and in use, an axial DC potential gradient may be maintained along at least 10%, 20%, 30%, 40%, 50%, 60%, 70%, 80%, 90%, 95% or 100% of the inner electrode by applying a DC potential difference across 10%, 20%, 30%, 40%, 50%, 60%, 70%, 80%, 90%, 95% or 100% of the inner electrode.

In a further embodiment the inner electrode may comprise a cylindrical electrode or a plurality of concentric cylindrical electrodes. An axial DC potential gradient may be maintained along at least 10%, 20%, 30%, 40%, 50%, 60%, 70%, 80%, 90%, 95% or 100% of the inner electrode by maintaining at least some of the plurality of concentric cylindrical electrodes at different DC potentials.

In a preferred embodiment the inner and/or outer electrode comprise a plurality of electrodes such that in a mode of operation an axial DC potential gradient may be maintained along at least 10%, 20%, 30%, 40%, 50%, 60%, 70%, 80%, 90%, 95% or 100% of the length of the inner and/or outer electrode so that ions are urged along at least a portion of the ion guide. The axial DC potential gradient may be maintained substantially constant with time as ions pass along the ion guide. Alternatively, the axial DC potential gradient may vary with time as ions pass along the ion guide.

The ion guide may comprise 3, 4, 5, 6, 7, 8, 9, 10, 11, 12, 13, 14, 15, 16, 17, 18, 19, 20, 21, 22, 23, 24, 25, 26, 27, 28, 29, 30 or >30 segments, wherein each segment comprises 1, 2, 3, 4, 5, 6, 7, 8, 9, 10, 11, 12, 13, 14, 15, 16, 17, 18, 19, 20, 21, 22, 23, 24, 25, 26, 27, 28, 29, 30 or >30 electrodes. The electrodes in each segment or a plurality of segments are preferably maintained at substantially the same DC potential. Each segment may be maintained at substantially the same DC potential as the subsequent nth segment wherein n is 3, 4, 5, 6, 7, 8, 9, 10, 11, 12, 13, 14, 15, 16, 17, 18, 19, 20, 21, 22, 23, 24, 25, 26, 27, 28, 29, 30 or >30.

In a preferred embodiment, ions are constrained axially within the ion guide by a real potential barrier or well. Preferably, the transit time of ions through the ion guide is selected from the group consisting of: less than or equal to 20 ms, less than or equal to 10 ms, less than or equal to 5 ms, less than or equal to 1 ms, and less than or equal to 0.5 ms.

In a further embodiment, one or more transient DC voltages or one or more transient DC voltage waveforms may be initially provided at a first axial position and may then subsequently be provided at second, then third different axial positions along the ion guide. The one or more transient DC voltages or one or more transient DC voltage waveforms may move from one end of the ion guide to another end of the ion guide so that ions are urged along the ion guide. Preferably, the one or more transient DC voltages create a potential hill or barrier, a potential well, multiple potential hills or barriers, multiple potential wells, a combination of a potential hill or barrier and a potential well, or a combination of multiple potential hills or barriers and multiple potential wells. The one or more transient DC voltage waveforms may comprise a repeating waveform, such as a square wave. The amplitude of the one or more transient DC voltages or the one or more transient DC voltage waveforms may remain substantially constant or may vary with time. The amplitude of the one or more transient DC voltages or the one or more transient DC voltage waveforms may increase with time, increase then decrease with time, decrease with time or decrease then increase with time.

In a preferred embodiment the ion guide may comprise an upstream entrance region, a downstream exit region and an intermediate region. In the entrance region, intermediate region and exit region the amplitude of the one or more transient DC voltages or the one or more transient DC voltage waveforms may have a first amplitude, second amplitude and third amplitude respectively. The entrance and/or exit region may comprise <5%; 5-10%, 10-15%, 15-20%, 20-25%, 25-30%, 30-35%, 35-40% or 40-45% of the total axial length of the ion guide. Preferably, the first and/or third amplitudes are substantially zero and the second amplitude is substantially non-zero. The second amplitude may be larger than the first and/or third amplitudes.

In a further embodiment the one or more transient DC voltages or the one or more transient DC voltage waveforms pass along the ion guide with a first velocity. The first velocity may either remain substantially constant, vary, increase, increase then decrease, decrease, decrease then increase, reduce to substantially zero, reverse direction, or reduce to substantially zero and then reverse direction. The one or more transient DC voltages or the one or more transient DC voltage waveforms preferably causes ions within the ion guide to pass along the ion guide with a second velocity. The first velocity and the second velocity may be substantially the same. The first and second velocities may differ by less than or equal to 100 m/s, 90 m/s, 80 m/s, 70 m/s, 60 m/s, 50 m/s, 40 m/s, 30 m/s, 20 m/s, 10 m/s, 5 m/s or 1 m/s. The first and/or second velocities may be 10-250 m/s, 250-500 m/s, 500-750 m/s, 750-1000 m/s, 1000-1250 m/s, 1250-1500 m/s, 1500-1750 m/s, 1750-2000 m/s, 2000-2250 m/s, 2250-2500 m/s, 2500-2750 m/s or 2750-3000 m/s.

In a preferred embodiment the one or more transient DC voltages or the one or more transient DC voltage waveforms may have a frequency or wavelength which remains substantially constant, varies, increases, increases then decreases, decreases, or decreases then increases.

In yet a further embodiment two or more transient DC voltages or two or more transient DC voltage waveforms may pass substantially simultaneously along the ion guide. The two or more transient DC voltages or waveforms may be arranged to move in the same direction, in opposite directions, towards each other or away from each other. One or more of the transient DC voltages or waveforms may be repeatedly generated and passed along the ion guide. The frequency of generating the one or more transient DC voltages or waveforms may remain substantially constant, vary, increase, increase then decrease, decrease, or decrease then increase.

In another embodiment the mass spectrometer may comprise an ion detector which is arranged to be substantially phase locked with pulses of ions emerging from the exit of the ion guide. The mass spectrometer may further or instead comprise a Time of Flight mass analyser comprising an electrode for injecting ions into a drift or flight region, the electrode being arranged to be energised in a substantially synchronised manner with the pulses of ions emerging from the exit of the ion guide. The mass spectrometer may further or instead comprise an ion trap arranged downstream of the ion guide, the ion trap being arranged to store and/or release ions from the ion trap in a substantially synchronised manner with pulses of ions emerging from the exit of the ion guide. The mass spectrometer may further comprises a mass filter arranged downstream of the ion guide. A mass to charge ratio transmission window of the mass filter may be varied in a substantially synchronised manner with pulses of ions emerging from the exit of the ion guide in order to select ions having a particular charge state. Pulses of ions entering the ion guide may also be synchronised with the transient DC potentials or waveforms.

In another embodiment the ion guide may comprise one, two, or more than two entrances for receiving ions and one, two, or more than two exits from which ions emerge from the ion guide. The inner and/or outer electrode may also be substantially Y-shaped.

In yet a further embodiment the ion guide comprises at least one entrance for receiving ions along a first axis and at least one exit from which ions emerge from the ion guide along a second axis, wherein the outer electrode and/or the inner electrode are curved between the entrance and the exit. The ion guide may, for example, be substantially "S"-shaped and/or have a single point of inflexion. The second axis may also be laterally displaced from the first axis. The second axis may be inclined at an angle θ to the first axis, wherein θ>0°. Preferably, θ falls within the range <10°, 10-20°, 20-30°, 30-40°, 40-50°, 50-60°, 60-70°, 70-80°, 80-90°, 90-100°, 100-110°, 110-120°, 120-130°, 130-140°, 140-150°, 150-160°, 160-170° or 170-180°.

The preferred ion guide may also have at least a portion which varies in size and/or shape along the length of the ion guide, or may have a width and/or height which progressively tapers in size.

In a less preferred embodiment the ion guide may comprise an inner electrode which is arranged offset from the central axis of the outer electrode. The distance between the inner electrode and the outer electrode may vary along at least a portion of the ion guide.

The mass spectrometer preferably comprises an Electrospray ("ESI") ion source, an Atmospheric Pressure Chemical Ionisation ("APCI") ion source, an Atmospheric Pressure Photo Ionisation ("APPI") ion source, a Matrix Assisted Laser Desorption Ionisation ("MALDI") ion source, a Laser Desorption Ionisation ("LDI") ion source, an Inductively Coupled Plasma ("ICP") ion source, an Electron Impact ("EI") ion source, a Chemical Ionisation ("CI") ion source, a Fast Atom Bombardment ("FAB") ion source or a Liquid Secondary Ions Mass Spectrometry ("LSIMS") ion source. The ion source may be pulsed or continuous.

In a further embodiment the entrance and/or exit of the ion guide is maintained at a potential so that ions are reflected at the entrance and/or exit of the ion guide. At least one ring lens, plate electrode or grid electrode may be arranged at the entrance and/or exit of the ion guide and may be maintained at a potential so that ions are reflected at the entrance and/or exit of the ion guide. An AC or RF voltage and/or a DC voltage may be supplied to the at least one ring lens, plate electrode or grid electrode so that ions are reflected at the entrance and/or exit of the ion guide.

In a preferred embodiment the mass spectrometer further comprises a mass analyser arranged downstream of the ion guide. The mass analyser may, for example, comprise a Time of Flight mass analyser, a quadrupole mass analyser, a Fourier Transform Ion Cyclotron Resonance ("FTICR") mass analyser, a 2D (linear) quadrupole ion trap, a 3D (Paul) quadrupole ion trap or a magnetic sector mass analyser.

Preferably, in a mode of operation the ion guide may be maintained in use at relatively high pressures, e.g. greater than or equal to 0.0001 mbar, greater than or equal to 0.0005 mbar, greater than or equal to 0.001 mbar, greater than or equal to 0.005 mbar, greater than or equal to 0.01 mbar, greater than or equal to 0.05 mbar, greater than or equal to 0.1 mbar, greater than or equal to 0.5 mbar, greater than or equal to 1 mbar, greater than or equal to 5 mbar, greater than or equal to 10 mbar, less than or equal to 10 mbar, less than or equal to 5 mbar, less than or equal to 1 mbar, less than or equal to 0.5 mbar, less than or equal to 0.1 mbar, less than or equal to 0.05 mbar, less than or equal to 0.01 mbar, less than or equal to 0.005 mbar, less than or equal to 0.001 mbar, less than or equal to 0.0005 mbar, or less than or equal to 0.0001 mbar. The ion guide may be maintained in use at a pressure between 0.0001 and 10 mbar, between 0.0001 and 1 mbar, between 0.0001 and 0.1 mbar, between 0.0001 and 0.01 mbar, between 0.0001 and 0.001 mbar, between 0.001 and 10 mbar, between 0.001 and 1 mbar, between 0.001 and 0.1 mbar, between 0.001 and 0.01 mbar, between 0.01 and 10 mbar, between 0.01 and 1 mbar, between 0.01 and 0.1 mbar, between 0.1 and 10 mbar, between 0.1 and 1 mbar, or between 1 and 10 mbar.

According to other embodiments the ion guide may be maintained in use at relatively low pressures, e.g. greater than or equal to $1\times10^{-7}$ mbar, greater than or equal to $5\times10^{-7}$ mbar, greater than or equal to $1\times10^{-6}$ mbar, greater than or equal to $5\times10^{-6}$ mbar, greater than or equal to $1\times10^{-5}$ mbar, and greater than or equal to $5\times10^{-5}$ mbar, less than or equal to $1\times10^{-4}$ mbar, less than or equal to $5\times10^{-5}$ mbar, less than or equal to $1\times10^{-5}$ mbar, less than or equal to $5\times10^{-6}$ mbar, less than or equal to $1\times10^{-6}$ mbar, less than or equal to $5\times10^{-7}$ mbar, or less than or equal to $1\times10^{-7}$ mbar. The ion guide may be maintained at a pressure between $1\times10^{-7}$ and $1\times10^{-4}$ mbar, between $1\times10^{-7}$ and $5\times10^{-5}$ mbar, between $1\times10^{-7}$ and $1\times10^{-5}$ mbar, between $1\times10^{-7}$ and $5\times10^{-6}$ mbar, between $1\times10^{-7}$ and $1\times10^{-6}$ mbar, between $1\times10^{-7}$ and $5\times10^{-7}$ mbar, between $5\times10^{-7}$ and $1\times10^{-4}$ mbar, between $5\times10^{-7}$ and $5\times10^{-5}$ mbar, between $5\times10^{-7}$ and $1\times10^{-5}$ mbar, between $5\times10^{-7}$ and $5\times10^{-6}$ mbar, between $5\times10^{-7}$ and $1\times10^{-6}$ mbar, between $1\times10^{-6}$ mbar and $1\times10^{-4}$ mbar, between $1\times10^{-6}$ and $5\times10^{-5}$ mbar, between $1\times10^{-6}$ and $1\times10^{-5}$ mbar, between $1\times10^{-6}$ and $5\times10^{-6}$ mbar, between $5\times10^{-6}$ mbar and $1\times10^{-4}$ mbar, between $5\times10^{-6}$ and $5\times10^{-5}$ mbar, between $5\times10^{-6}$ and $1\times10^{-5}$ mbar, between $1\times10^{-5}$ mbar and $1\times10^{-4}$ mbar, between $1\times10^{-5}$ and $5\times10^{-5}$ mbar, or between $5\times10^{-5}$ and $1\times10^{-4}$ mbar.

From another aspect the present invention provides a mass spectrometer comprising an ion guide having a guide wire, cylindrical or rod electrode and an outer cylindrical electrode wherein, in use, both an AC and a DC potential difference is maintained between the guide wire, cylindrical or rod electrode and the outer cylindrical electrode.

From another aspect the present invention provides a method of mass spectrometry, comprising guiding ions along an ion guide comprising an outer electrode and an inner electrode disposed within the outer electrode, maintaining the inner and outer electrodes at a DC potential difference such that ions experience a first radial force towards the inner electrode and applying an AC or RF voltage to the inner and/or the outer electrodes so that ions experience a second radial force towards the outer electrode.

From another aspect the present invention provides a mass spectrometer comprising an ion guide comprising a guide wire held centrally in an electrically conductive cylindrical tube electrode wherein both AC and DC voltages are applied, in use, between the guide wire and the cylindrical tube electrode in order to radially retain ions whilst the ions are being transported axially through the ion guide. Preferably, the guide wire comprises a semiconductor or resistive wire so that an axial DC field is maintained, in use, along the ion guide by the application of a DC voltage between the ends of the guide wire.

From another aspect the present invention provides a mass spectrometer comprising an ion guide comprising a guide wire held centrally in a plurality of outer concentric cylindrical electrodes wherein both AC and DC voltages are applied, in use, between the guide wire and the plurality of outer concentric cylindrical electrodes in order to radially retain ions whilst the ions are being transported axially through the ion guide. Preferably, an axial DC field is maintained, in use, along the ion guide by the application of DC voltages to the plurality of outer cylindrical electrodes. Travelling potential wave functions may be applied, in use, to the outer cylindrical electrodes to assist in ion transmission.

From another aspect the present invention provides a mass spectrometer comprising an ion guide comprising a guide wire held centrally in an electrically conductive cylindrical tube electrode wherein both AC and DC voltages are applied, in use, between the guide wire and the cylindrical tube electrode. The ions are arranged, in use, to impact the inside wall of the cylindrical tube electrode or the guide wire to produce secondary ion disassociation by adjusting the AC or DC voltages.

From another aspect the present invention provides a mass spectrometer comprising an ion guide comprising a guide wire held centrally in an electrically conductive cylindrical tube electrode wherein both AC and DC voltages are applied, in use, between the guide wire and the cylindrical tube electrode. The AC voltage or the DC voltage is adjusted so as to cause an increase in the internal energy of ions within the ion guide thereby inducing collisional fragmentation or collisional induced disassociation of the ions.

From another aspect the present invention provides a mass spectrometer comprising an ion guide comprising an inner cylindrical electrode held centrally in an electrically conductive cylindrical tube electrode wherein both AC and DC voltages are applied, in use, between the inner cylindrical electrode and the cylindrical tube electrode in order to radially retain ions whilst the ions are being transported axially through the ion guide.

From another aspect the present invention provides a mass spectrometer comprising an ion guide comprising a guide wire held centrally in an electrically conductive cylindrical tube electrode wherein both AC and DC voltages are applied, in use, between the guide wire and the cylindrical tube electrode in order to radially retain ions whilst the ions are being transported axially through the ion guide and wherein the guide wire splits into two or more wires. In one embodiment different AC or DC voltages are applied to the two or more wires.

From another aspect the present invention provides a mass spectrometer comprising an ion guide comprising a guide wire held centrally in an electrically conductive cylindrical tube electrode wherein both AC and DC voltages are applied, in use, between the guide wire and the cylindrical tube electrode in order to radially retain ions whilst the ions are being transported axially through the ion guide and wherein the guide wire is not straight. In one embodiment the guide wire is circular.

From another aspect the present invention provides a mass spectrometer comprising an ion guide, the ion guide comprising a Y-shaped outer cylindrical electrode and a Y-shaped inner guide wire electrode. In use, the outer electrode and the inner electrode are supplied with both an AC voltage and a DC voltage and the ion guide is arranged so that an ion beam is split or ion beams are joined.

From another aspect the present invention provides a mass spectrometer comprising an ion guide comprising a guide wire held centrally in an electrically conductive cylindrical tube electrode wherein both AC and DC voltages are applied, in use, between the guide wire and the cylindrical tube electrode in order to radially retain ions whilst the ions are being transported axially through the ion guide. The ion guide further comprises a ring lens, plate or grid and an additional DC or AC voltage is applied, in use, to the ring lens, plate or grid so that ions are reflected backwards and are trapped or stored within the ion guide.

The ion guide according to the preferred embodiment has both DC and AC/RF voltages applied to the inner and/or outer electrodes. The DC potential difference between the inner and outer electrodes causes ions of one polarity to be attracted to the inner electrode as with a conventional guide wire ion guide. However, the AC/RF voltages applied to one or both electrodes also generates a force which repels ions away from the inner electrode, irrespective of the polarity of the ions. The inhomogeneity of the AC/RF electric field between the electrodes increases closer to the inner electrode. Ions of both polarities will drift from regions of relatively high AC electric field inhomogeneity to regions of relatively low AC electric field inhomogeneity. Therefore, ions of both polarities will tend to drift away from the inner guide wire electrode and will move towards the outer cylindrical electrode. The AC/RF and DC voltages applied to the inner and/or outer electrodes therefore create a pseudo-potential well wherein the forces on ions of a particular polarity are balanced in an annular region or channel arranged between the inner and outer electrodes.

The ion guide of the preferred embodiment is different from conventional multipole rod sets and stacked ring ion tunnel ion guides in which RF voltages generate a pseudo-potential well which is aligned with the central axis of ion guide. Furthermore, the preferred ion guide is simpler and less expensive to manufacture than conventional multipole rod set ion guides and provides increased flexibility in the analysis and transmission of ions.

The preferred embodiment comprises an ion guide comprising a guide wire electrode arranged centrally within an outer cylindrical electrode. AC/RF and DC voltages are preferably applied to both the guide wire and/or the outer cylindrical electrode to radially confine the ions within an annular region whilst they pass axially through the ion guide. Collisional gas may be present or introduced into the ion guide in order to collisionally cool or alternatively to collisionally heat the ions. The voltages applied to the guide wire and the outer electrode and the diameters of the guide wire and the outer electrode determine whether collisional cooling or heating occurs within the ion guide.

The potential $V_{DC}(r)$ due to a DC potential difference $V_{DC}$ being maintained between the guide wire inner electrode and the cylindrical outer electrode as a function of radius r from the guide wire inner electrode is given as follows, where $R_{wire}$ and $R_{cylinder}$ are the radii of the guide wire and cylindrical outer electrode respectively:

$$V_{DC}(r) = V_{DC}\left[\frac{\ln\left(\frac{r}{R_{cylinder}}\right)}{\ln\left(\frac{R_{wire}}{R_{cylinder}}\right)}\right]$$

The potential difference due to the DC potentials applied to the guide wire and outer electrode generate an electric field $E_{DC}(r)$. The electric field strength $E_{DC}(r)$ between the guide wire and the cylindrical electrode increases in a direction towards the guide wire and is given below as a function of the radius r from the wire:

$$E_{DC}(r) = \frac{V_{DC}}{r\cdot\ln\left(\frac{R_{wire}}{R_{cylinder}}\right)}$$

Providing the ions are adiabatic and are moving relatively slowly in an inhomogeneous oscillatory electric field, the ion motion may be approximated by a fast oscillating motion, synchronous with the AC/RF electric field and superimposed on a slow drift motion. The drift motion is caused by the inhomogeneity of the electric fields and may be considered as if the ion is moving in an electrostatic potential or pseudo-potential.

The electric field due to the AC/RF voltages applied to the guide wire and outer electrode $E_{RF}(r)$ at one instance in time as a function of radius from the guide wire is given by:

$$E_{RF}(r) = \frac{V_{RF}}{r\cdot\ln\left(\frac{R_{wire}}{R_{cylinder}}\right)}$$

The radial AC/RF electric field $E_{RF}(r,t)$ as a function of radius from the guide wire and time t may be given by the following equation, where ω is the angular frequency of the AC/RF radial electric field:

$$E_{RF}(r,t)=E^{RF}(r)\cos(\omega t)$$

The pseudo-potential energy $P_{RF}(r)$ as a function of radius from the guide wire is given as follows, where q and m are the electronic charge and mass of the ion respectively:

$$P_{RF}(r) = q^2\frac{E_{RF}(r)^2}{4m\omega^2}$$

The combined effective potential $V_{EFF}(r)$ as a function of radius from the guide wire is given by the pseudo-potential energy $P_{RF}(r)$ divided by the ion electric charge q summed with the potential due to the DC voltages $V_{DC}(r)$ applied to the guide wire and cylindrical electrode. Substituting the equation for $E_{RF}(r)$ and the term for the DC potential $V_{DC}(r)$ from above gives the following combined effective potential $V_{EFF}(r)$:

$$V_{EFF}(r) = q\frac{V_{RF}^2}{4m\left(r\omega\ln\left(\frac{R_{wire}}{R_{cylinder}}\right)\right)^2} + V_{DC}\frac{\ln\left(\frac{r}{R_{cylinder}}\right)}{\ln\left(\frac{R_{wire}}{R_{cylinder}}\right)}$$

The pseudo-potential well approximation requires that the ion motion is such that the ions are adiabatic. If the ions are not adiabatic then they will gain kinetic energy from the oscillatory electric field and will be ejected from the ion guide. An adiabaticity parameter Adiab(r) for radial fields with no axial components is given by:

$$Adiab(r) = \frac{2\left|q\left(\frac{d}{dr}E_{RF}(r)\right)\right|}{m\omega^2}$$

Substituting the equation for the AC/RF radial electric field $E_{RF}(r)$ into the equation for the adiabaticity parameter gives:

$$Adiab(r) = 2\left|q\frac{V_{RF}}{r^2 m\omega^2\ln\left(\frac{R_{wire}}{R_{cylinder}}\right)}\right|$$

Empirically, provided ions are relatively slow and the adiabaticity parameter is below 0.4 then the pseudo-potential approximation holds.

DESCRIPTION OF THE DRAWINGS

Various embodiments of the present invention will now be described, by way of example only, and with reference to the accompanying drawings in which.

DETAILED DESCRIPTION OF THE DRAWINGS

Figure 1A:
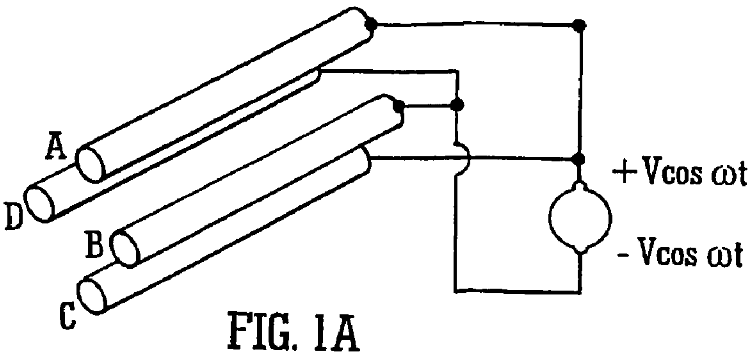
FIG. 1A PRIOR ART
FIG. 1A shows a conventional quadrupole rod set ion guide wherein AC voltages of opposite phases are supplied to adjacent rods.
Figure 1B:
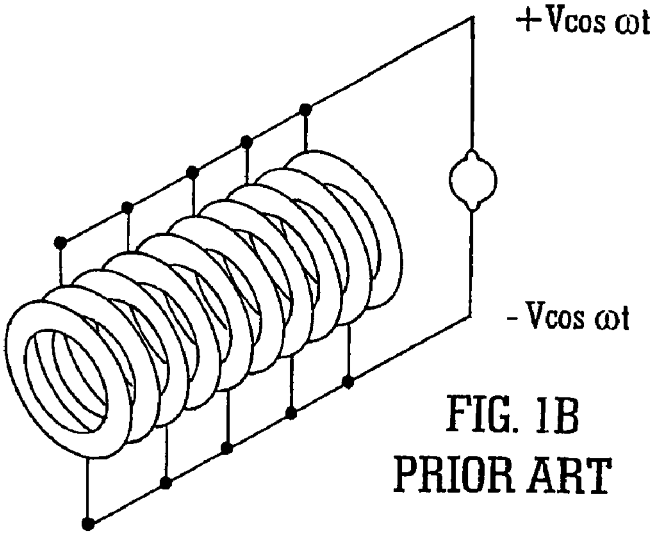
FIG. 1B PRIOR ART
FIG. 1B shows a conventional ion tunnel ion guide wherein AC voltages of opposite phase are supplied to alternate rings and FIG. 1C shows a conventional guide wire ion guide comprising a guide wire arranged along the central axis of a cylindrical tube electrode wherein a DC potential difference is maintained between the guide wire and the outer cylindrical electrode.
Figure 1C:
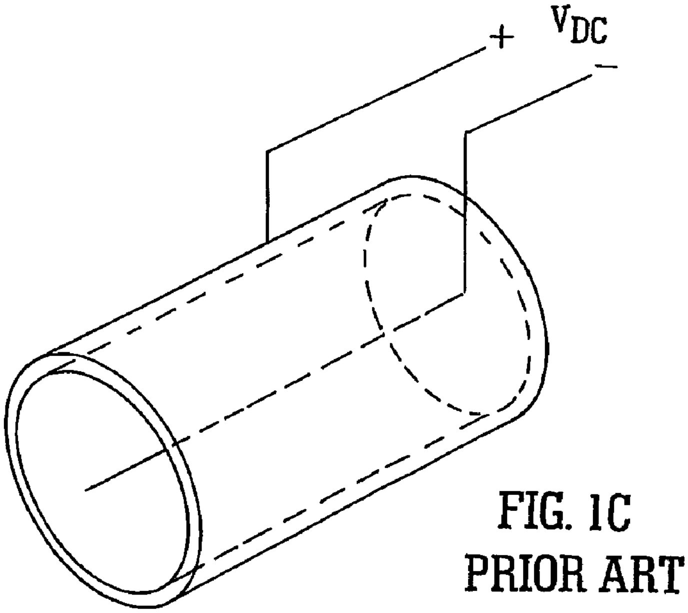
FIG. 1C PRIOR ART

The differences between a guide wire ion guide according to the preferred embodiment and other conventional ion guides will be illustrated by referring to some conventional forms of ion guide shown in FIGS. 1A-1C. FIG. 1A shows a conventional quadrupole rod set ion guide comprising a set of parallel rod electrodes. In this arrangement AC/RF voltages of opposite phases are supplied to adjacent rods so that inhomogeneous AC/RF electric fields generate a pseudo-potential well along the central axis of the rod set. Ions are confined within this pseudo-potential well and may be guided through the quadrupole rod set. FIG. 1B shows an ion tunnel ion guide comprising a stacked concentric circular ring set of electrodes wherein ions are transmitted through the apertures in the ring electrodes. The apertures are typically substantially all the same size. In this arrangement AC/RF voltages of opposite phases are supplied to alternate rings of the ion tunnel ion guide to generate a pseudo-potential well along the central axis of the ion guide which acts to radially confine ions which are passed through the ion guide. FIG. 1C shows a conventional guide wire ion guide comprising a guide wire electrode arranged along the central axis of a cylindrical tube electrode. In this arrangement a negative DC voltage is supplied to the guide wire to attract positive ions and a positive DC voltage is supplied to the outer cylindrical electrode to repel positive ions. Ions which enter the guide wire ion guide will follow elliptical paths around the guide wire under conditions of high vacuum. Conventional guide wire ion guides as shown in FIG. 1C are therefore only used to transport ions in regions of relatively low pressure wherein ion collisions with gas molecules are unlikely, otherwise the velocity of the ions would be dampened and the ions would discharge upon hitting the central guide wire with the result that the transmission efficiency would be near zero.

Figure 2A:
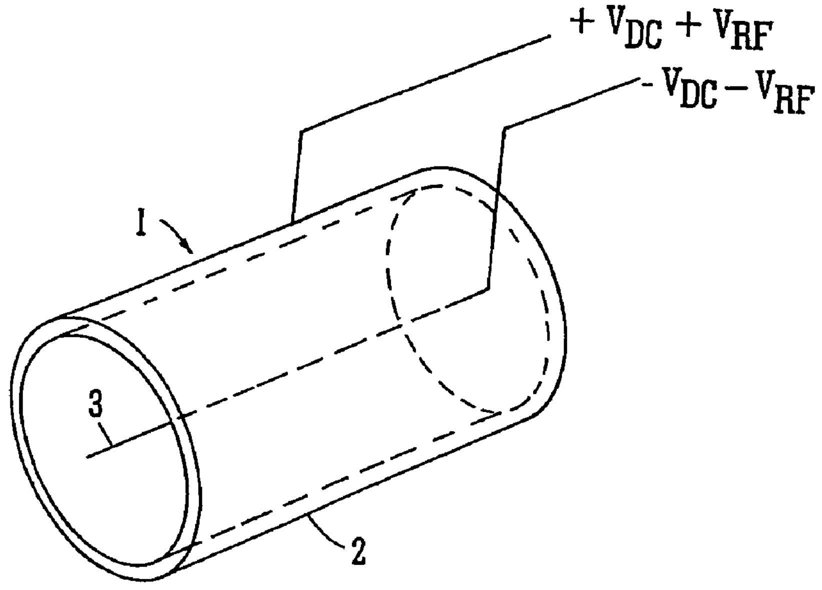
FIG. 2A shows a schematic of a guide wire ion guide according to the preferred embodiment comprising an outer cylindrical conducting electrode and an inner guide wire electrode arranged along the central axis of the cylindrical electrode wherein a DC potential difference is maintained between the guide wire and cylindrical electrodes and an AC or RF voltage is applied to the cylindrical electrode and/or the guide wire.
Figure 2B:
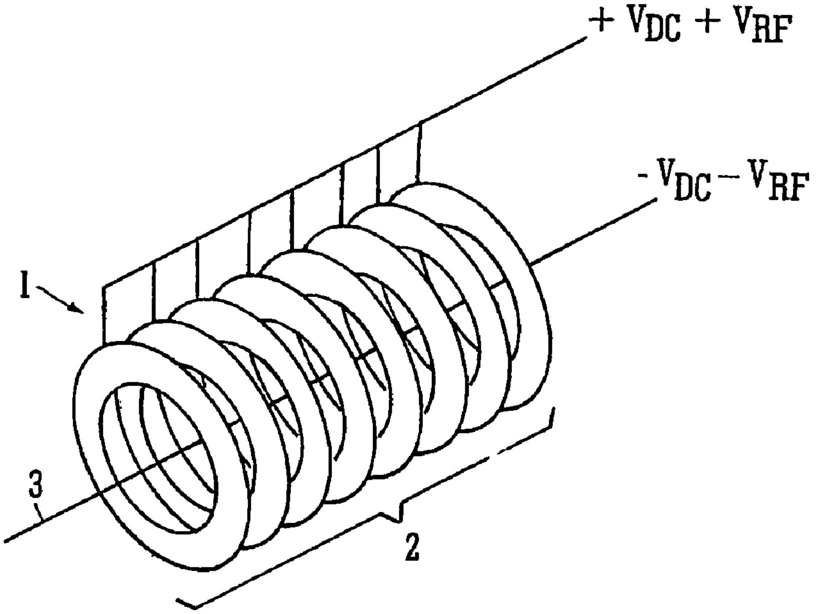
FIG. 2B shows a schematic of an ion guide according to a further preferred embodiment wherein the outer cylindrical electrode is segmented.

FIG. 2A shows a preferred embodiment of the present invention comprising a guide wire ion guide 1 comprising an outer cylindrical conducting electrode 2 and an inner guide wire electrode 3. According to a preferred embodiment the outer electrode 2 and the guide wire electrode 3 are coaxial. In operation DC voltages $V_{DC}$ are applied to the outer electrode 2 and/or the inner guide wire 3 so that a DC potential difference is maintained between the outer electrode 2 and the guide wire 3 in order to attract ions of one polarity towards the guide wire 3. AC or RF voltages $V_{RF}$ are also applied to the outer electrode 2 and/or the guide wire 3 so that ions irrespective of their polarity will be forced radially outwards by the inhomogeneous AC electric field. FIG. 2B shows a further preferred embodiment wherein the ion guide 1 comprises a stacked ring set outer electrode 2 wherein the outer electrode comprises a plurality of concentric cylindrical electrodes 2. In this embodiment the inner guide wire electrode 3 is arranged along the central axis of the stacked ring set 2. In operation AC/RF and DC voltages are supplied to the guide wire 3 and at least some of the cylindrical electrodes forming the outer electrode 2. In a preferred embodiment different AC/RF and/or DC voltages are applied to at least some of the cylindrical electrodes 2. An axial DC electric field may therefore be created by maintaining DC potential differences between the cylindrical electrodes 2 such that an axial DC voltage gradient is maintained along at least a portion of the guide wire ion guide 1. The axial DC voltage gradient may be used to urge ions along at least a portion of the ion guide 1 or to constrain the ions axially. According to a further embodiment travelling or transient DC potential waveforms or DC voltages may be applied to the ion guide 1 by varying the DC voltages applied to the cylindrical electrodes 2 with time. The transient DC voltages or waveforms may move along at least a portion of the ion guide 1 to urge ions along the ion guide 1. The transient DC voltages or waveforms may have amplitudes, wavelengths or frequencies which remain constant or vary with time. The transient DC voltages or waveforms may also be generated repeatedly at a frequency which either remains constant or varies with time. In one embodiment two or more transient DC voltages or waveforms pass simultaneously along the ion guide.

In a further embodiment the mass spectrometer may comprise components located downstream of the ion guide 1 whose operation is synchronised with the pulses of ions emerging from the ion guide. For example, an ion detector, pusher electrode of a Time of Flight mass analyser, ion trap or mass filter may be substantially synchronised with the pulses of ions emerging from the ion guide 1 when transient DC voltages are applied to the ion guide 1.

According to the preferred embodiment DC and AC/RF voltages are supplied to both the outer electrode 2 and inner electrode 3. However, according to other embodiments the AC/RF and/or DC voltages may only be applied to either the outer electrode 2 or the inner electrode 3, i.e. not both.

According to a less preferred embodiment the inner electrode may be displaced radially from the central axis of the outer electrode 2.

Figure 3:
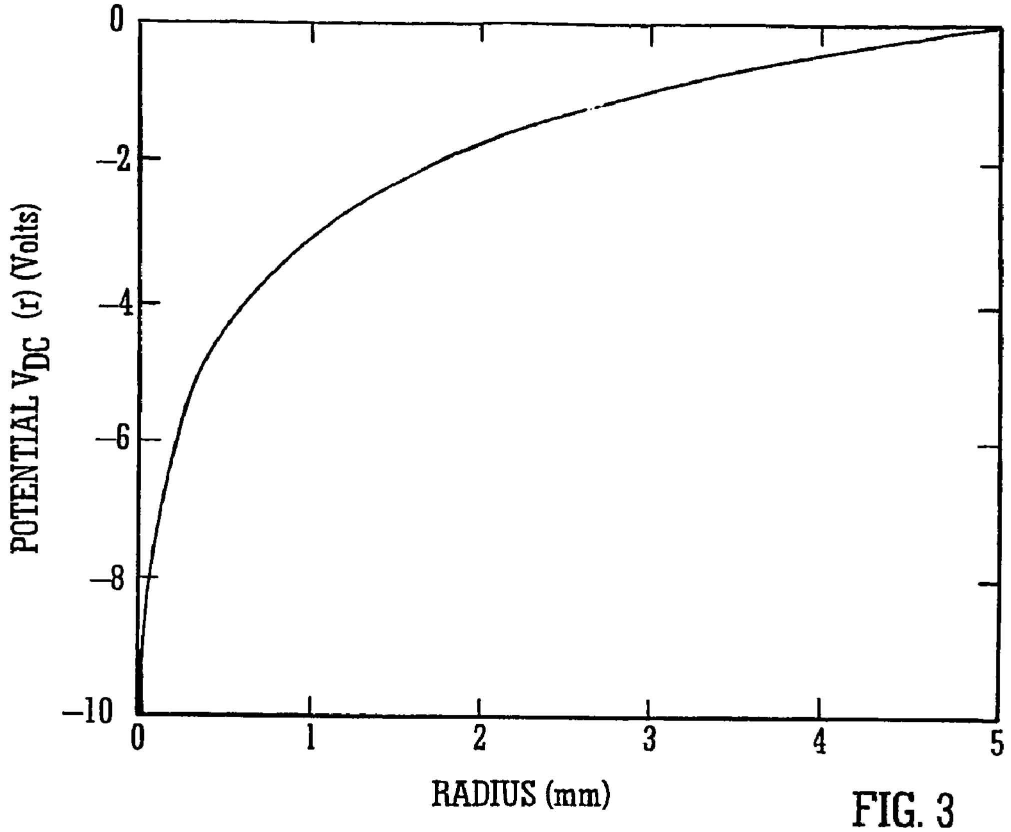
FIG. 3 shows the potential profile in the region between the guide wire and the outer cylindrical electrode when only DC voltages are applied to the cylindrical electrode and the guide wire.

FIG. 3 shows the potential profile between the guide wire 3 and the outer cylindrical electrode 2 when only DC voltages are applied to the two electrodes 2, 3. The outer electrode 2 had a radius of 5 mm and was grounded and the guide wire 3 had a radius of 0.025 mm and was maintained at −10 V. The application of DC voltages to the outer electrode 2 and the guide wire 3 generated a steep logarithmic potential well centred on the guide wire 3. It is apparent that ions will either be attracted to or repelled from the guide wire 3 depending upon the polarity of the ions. By supplying the outer electrode 2 and the guide wire 3 with AC/RF voltages according to the preferred embodiment, the radial force attracting ions to the guide wire 3 can be counterbalanced. The electric field inhomogeneities due to the AC/RF potentials force ions of both polarities radially outward. Therefore, by appropriate selection of the DC and AC/RF voltages which are applied to both the guide wire 3 and/or the outer electrode 2, the inward and the outward radial forces can be balanced for at least some of the ions being transmitted through the ion guide 1. Ions are therefore preferably confined in a pseudo-potential well within an annulus between the guide wire 3 and the outer electrode 2.

The pseudo-potential approximation requires that the ion motion is such that the ions are adiabatic. If the ions are not adiabatic then they will gain kinetic energy from the oscillatory AC/RF electric fields and will hence be ejected from the ion guide 1. The ions adiabaticity can be determined by an adiabaticity parameter which varies according to the mass to charge ratio of the ion, the distance of the ion from the guide wire 3, the dimensions of the ion guide 1 and the AC/RF electric field parameters. If ions have an adiabaticity parameter which is sufficiently low then they can be said to be adiabatic and hence will remain stable within the ion guide 1.

Figure 4:
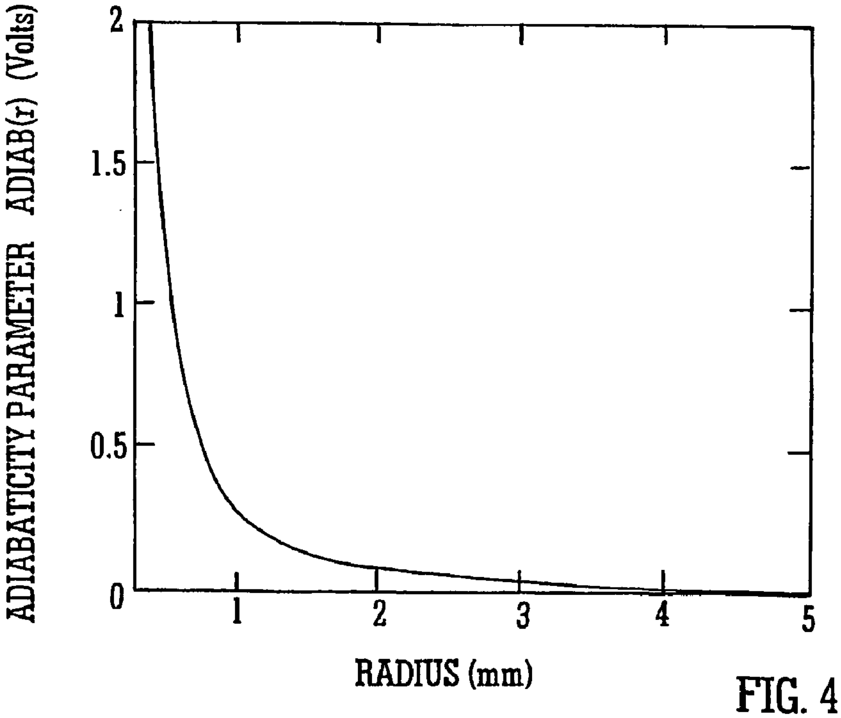
FIG. 4 shows the adiabaticity parameter in the region between the guide wire and the outer cylindrical electrode for ions having a mass to charge ratio of 1000.

FIG. 4 shows the adiabaticity parameter in the region between the guide wire 3 and the outer cylindrical electrode 2 as a function of radius from the guide wire 3 for ions having a mass to charge ratio of 1000. In this example the cylindrical electrode 2 was grounded and the guide wire 3 was maintained at −30 V to create a DC potential difference of −30 V. The outer electrode 2 and the guide wire 3 were connected to an RF voltage supply of 900 V having a frequency of 11 rad/μs (AC frequency of 1.75 MHz). As the ions approach the guide wire 3 (i.e. as the radius decreases) the adiabaticity parameter of the ions increases and the ions begin to pick up energy from the oscillating AC/RF electric field. If the adiabaticity parameter increases above a threshold value (e.g. about 0.4) then the ions will pick up an excessive amount of kinetic energy and will no longer be stable in the pseudo-potential well. Therefore, if ions travel too close to the guide wire 3 then they may not be transmitted by the ion guide 1.

The potential between the guide wire 3 and the outer electrode 2 due to the DC voltages applied to them is independent of the ion mass m and charge q. However, the potential due to the AC/RF voltages is proportional to the mass to charge ratio of the ion (q/m). Hence, the position and magnitude of the pseudo-potential well is a function of the mass to charge ratio of the ions.

Figure 5:
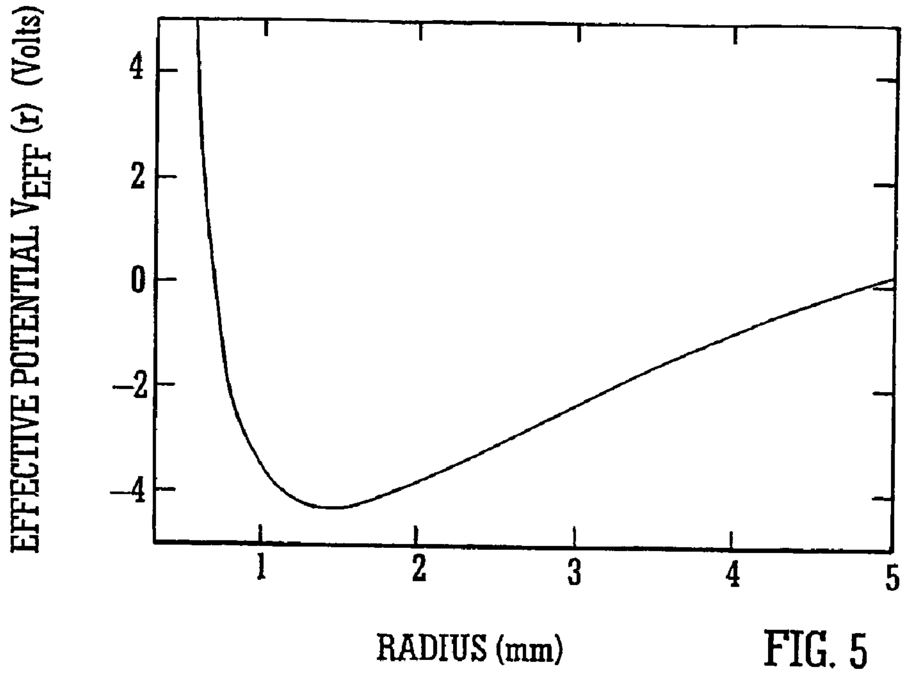
FIG. 5 shows the pseudo-potential profile in the region between the guide wire and the outer cylindrical electrode for ions having a mass to charge ratio of 1000 when both DC voltages and AC/RF voltages are applied to the cylindrical electrode and guide wire.

FIG. 5 illustrates the pseudo-potential profile in the region between the guide wire 3 and the outer cylindrical electrode 2 for ions having a mass to charge ratio of 1000 when both DC and AC/RF voltages are applied to the electrodes 2, 3. In this example the guide wire 3 has a radius of 0.025 mm and the outer electrode 2 has a radius of 5 mm. The cylindrical electrode 2 is grounded and the guide wire 3 is maintained at −30 V to create a DC potential difference of −30 V. The outer electrode 2 and the guide wire 3 are also connected to an RF voltage supply of 900 V having a frequency of 11 rad/μs (AC frequency of 1.75 MHz). The combination of DC and AC voltages provides a pseudo-potential well in an annulus between the guide wire 3 and outer electrode 2 which is centred approximately 1.4 mm radially outward from the central guide wire 3. Accordingly, provided ions enter the guide wire ion guide 1 relatively slowly and have a suitably low adiabaticity parameter then they will remain confined within the potential well and will be transmitted through the ion guide 1.

Figure 6:
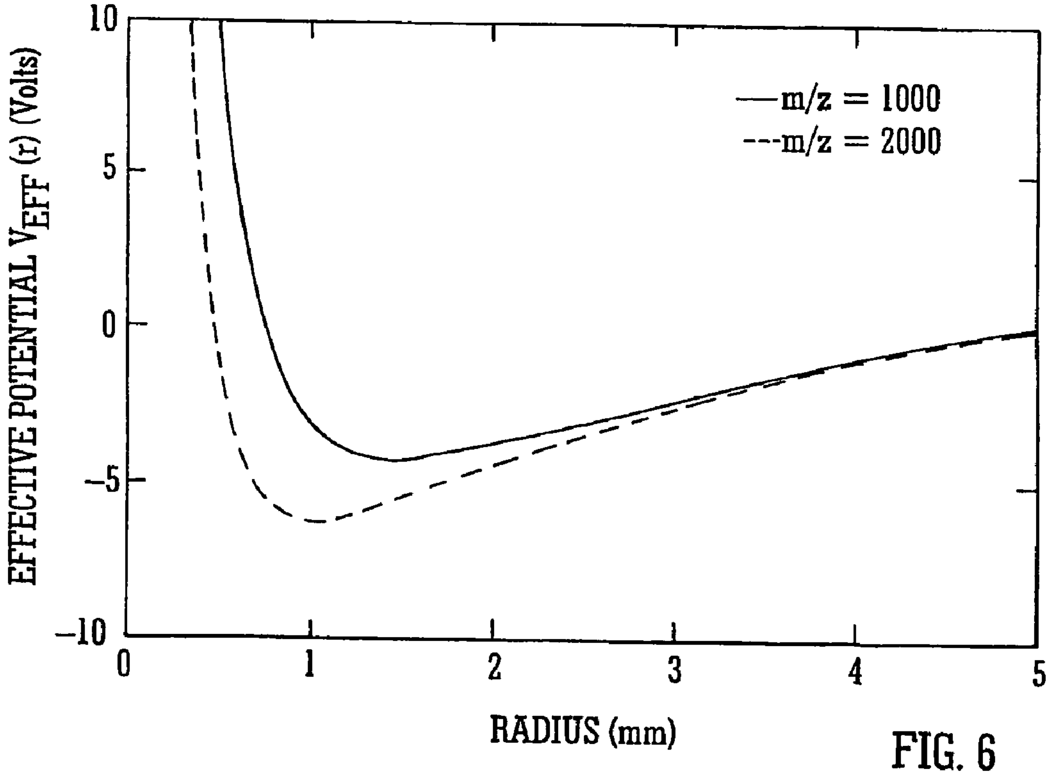
FIG. 6 shows the pseudo-potential profile in the region between the guide wire and the outer cylindrical electrode for ions having a mass to charge ratio of 1000 and 2000 when both DC and AC/RF voltages are applied to the cylindrical electrode and the guide wire.

FIG. 6 shows the pseudo-potential profile in the region between the guide wire 3 and the outer cylindrical electrode 2 for ions having mass to charge ratios of 1000 and 2000 when both DC and AC/RF voltages are applied to the electrodes 2, 3. The guide wire 3 has a radius of 0.025 mm and the outer electrode has a radius of 5 mm. The cylindrical electrode 2 was grounded and the guide wire 3 was maintained at −30 V to create a DC potential difference of −30 V. The outer electrode 2 and the guide wire 3 were also connected to an RF voltage supply of 900 V having a frequency of 11 rad/μs (AC frequency of 1.75 MHz). The pseudo-potential profile for ions having a mass to charge ratio of 1000 is shown by the solid line and the pseudo-potential profile for ions having a higher mass to charge ratio of 2000 is shown by the dashed line. It can be seen that ions having a mass to charge ratio of 1000 have a pseudo-potential well centred at a radius approximately 1.4 mm from the guide wire 3, whereas ions having a mass to charge ratio of 2000 have a deeper pseudo-potential well centred at a radius approximately 0.9 mm from the guide wire 3, i.e. closer to the guide wire 3.

In a preferred embodiment a gas is either present in or is introduced into the guide wire ion guide 1. Ions may be cooled by repetitive collisions with the gas molecules such that the ions will tend to congregate near the bottom of their respective pseudo-potential wells. Accordingly, ions having lower mass to charge ratios will congregate in annular regions at larger radii from the guide wire 3 whereas ions having relatively higher mass to charge ratios will congregate in annular regions closer to the guide wire 3. Therefore, ions having lower mass to charge ratios will orbit the guide wire 3 at larger radii than ions having relatively higher mass to charge ratios. As such, the ion guide 1 may be used according to a less preferred embodiment to separate ions according to their mass to charge ratios. In one embodiment the AC/RF and/or DC voltages applied to the outer electrode 2 and to the guide wire 3 may be varied or scanned such that ions having a desired range of mass to charge ratios are arranged to congregate at either the guide wire 3 or the outer electrode 2 and hence will be lost from the ion guide 1. Ions may therefore be filtered according to their mass to charge ratio.

According to another embodiment the AC/RF and/or DC voltages applied to the electrodes forming the ion guide 1 may be arranged such that the ions are caused to increase in internal energy so that collisional fragmentation or Collisional Induced Disassociation ("CID") results. According to another embodiment the AC/RF and/or DC voltages applied to the ion guide 1 may be arranged such that ions impact either the outer electrode 2 or the guide wire 3 to induce Secondary Ion Disassociation (SID).

Ion motion through a guide wire ion guide 1 according to the preferred embodiment was simulated using a SIMION numerical ion simulation program (version 7.0). The resulting simulations are shown in FIGS. 7-10.

Figure 7:
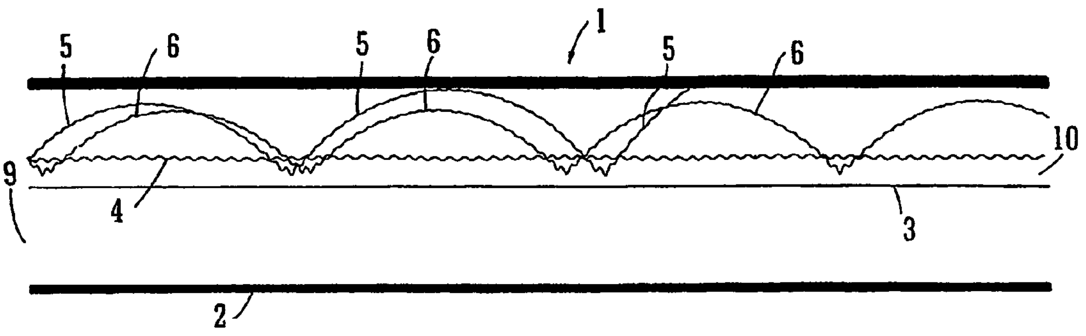
FIG. 7 shows an ion simulation illustrating the ion motion in a guide wire ion guide for three ions having identical mass to charge ratios of 1000, initial kinetic energies of 8 eV and being released at a distance of 1.45 mm from the central axis and at angles of 45°, 0° and −45° relative to the guide wire.

FIG. 7 shows a simulation for the ion motion through a preferred ion guide 1 for three ions 4, 5, 6 having a mass to charge ratio of 1000, initial kinetic energies of 8 eV, being released at a distance of 1.45 mm from the central axis and at an angle of 45°, 0° and −45° relative to the guide wire 3. The cylindrical electrode 2 and the guide wire 3 were maintained at 0 V DC and −30 V DC respectively. The outer electrode 2 and the guide wire 3 are also connected to an RF voltage supply of 900 V having a frequency of 11 rad/μs (AC frequency of 1.75 MHz). In this simulation the ions 4, 5, 6 were released at the entrance 9 to the preferred ion guide 1 at a radius from the guide wire 3 which was approximately at the centre of the pseudo-potential well. The ions 4 which entered the ion guide 1 at an angle of 0° relative to the guide wire 3 passed from the entrance 9 of the ion guide 1 to the exit 10 along a path which was substantially parallel to the guide wire 3. These ions 4 remained stable in the pseudo-potential well and were radially confined and transmitted through the ion guide 1.

Ions 5 which entered the ion guide 1 at an angle of 45° relative to the guide wire 3, traveled radially outward towards the outer electrode 2 away from the centre of the pseudo-potential well until they were attracted back towards the guide wire 3 by the force due to the applied DC voltages. The ions 5 then traveled towards the guide wire 3 and past the centre of the pseudo-potential well until the force due to the AC/RF fields repelled them back towards the outer electrode 2. In this manner the ions 5 oscillate radially in the pseudo-potential well whilst they pass along the ion guide 1. However, as the ions 5 oscillate they travel to a radius which is relatively close to the guide wire 3 and at which the radial electric field gradient is high. At such a small radius from the guide wire 3 the adiabaticity parameter of the ions 5 increases and the ions 5 can no longer be said to be adiabatic. The ions therefore pick up kinetic energy from the oscillating AC/RF electric fields and are repelled from the guide wire 3 with excessive radial energy such that they ultimately strike the outer electrode 2. The ions 5 which strike the outer electrode 2 are neutralised and are not transmitted by the ion guide 1. Therefore, the AC/RF and/or DC voltages may be selected such that ions which enter the ion guide 1 at certain angles relative to the guide wire 3 are not transmitted.

Ions 6 which entered the ion guide 1 at an angle of −45° with respect to the guide wire 3 also oscillated radially in the pseudo-potential well as they traveled axially. Although the ions 6 do pass close to the guide wire 3 and pick up a slight amount of radial kinetic energy the acquired kinetic energy is not excessive and as such the ions 6 do not strike the outer electrode 2. Accordingly, the ions 6 oscillate radially in the pseudo-potential well and are transmitted from the entrance 9 to the exit 10 of the ion guide 1.

Figure 8:
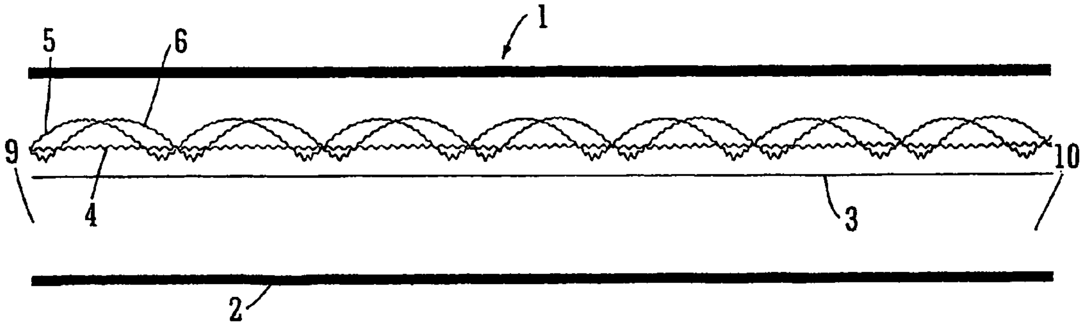
FIG. 8 shows an ion simulation illustrating the ion motion in a guide wire ion guide for three ions having identical mass to charge ratios of 1000, less energetic initial kinetic energies of 4 eV and being released at a distance of 1.45 mm from the central axis and at angles of 45°, 0° and −45° relative to the guide wire.

FIG. 8 shows a simulation for the ion motion through a preferred ion guide 1 for three ions 4, 5, 6 having mass to charge ratios of 1000, initial kinetic energies of 4 eV and being released at a distance of 1.45 mm from the central axis and at an angle of 45°, 0° and −45° relative to the guide wire 3. The outer cylindrical electrode 2 and the guide wire 3 were maintained at 0 V DC and −30 V DC respectively. The outer electrode 2 and the guide wire 3 are also connected to an RF voltage supply of 900 V having a frequency of 11 rad/μs (AC frequency of 1.75 MHz). In this simulation the ions 4, 5, 6 have half of the initial kinetic energy of the ions shown and described in relation to FIG. 7. All the ions 4, 5, 6 remain at radii from the guide wire 3 wherein the adiabaticity parameter is below the threshold at which ions 4, 5, 6 could gain a substantial amount of radial kinetic energy from the AC/RF electric fields. As such, all the ions 4, 5, 6 remain radially confined within and are transmitted through the ion guide 1 irrespective of whether their entrance angle is 45°, 0° or −45° with respect to the guide wire 3.

Figure 9:
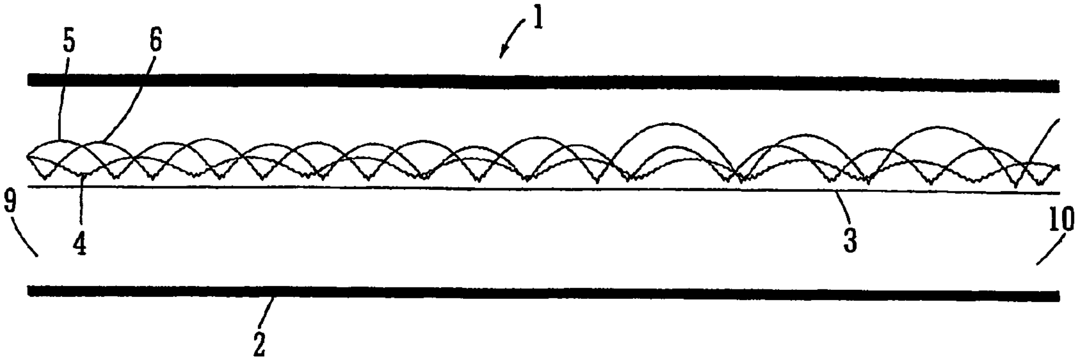
FIG. 9 shows an ion simulation illustrating the ion motion in a guide wire ion guide for three ions having identical mass to charge ratios of 3000, initial kinetic energies of 4 eV and being released at a distance of 1.45 mm from the central axis and at angles of 45°, 0° and −45° relative to the guide wire.

FIG. 9 shows a simulation for the ion motion through a preferred ion guide 1 for three ions 4, 5, 6 having a mass to charge ratios of 3000, initial kinetic energies of 4 eV and being released at a distance of 1.45 mm from the central axis and at an angle of 45°, 0° and −45° relative to the guide wire 3. The outer cylindrical electrode 2 and the guide wire 3 were maintained at 0 V DC and −30 V DC respectively. The outer electrode 2 and the guide wire 3 are also connected to an RF voltage supply of 900 V having a frequency of 11 rad/μs (AC frequency of 1.75 MHz). In this simulation the ions have a higher mass to charge ratio than the ions shown and described in relation to FIG. 8 and therefore have a pseudo-potential well which is deeper and centred at a radius closer to the guide wire 3. Ions 4 which enter the ion guide 1 at an angle of 0° relative to the guide wire 3 and at a position which is radially outward from the centre of the pseudo-potential well oscillate about the centre of the well as they are transmitted from the entrance 9 to the exit 10 of the ion guide 1. Ions 5 which enter the ion guide 1 at 45° relative to the guide wire 3 also oscillate about the centre of the well as they are transmitted to the exit 10. Ions 6 which enter the ion guide at −45° relative to the guide wire 3 have an initial radial velocity towards the guide wire 3 and travel closer to the guide wire 3 than the other ions 4, 5. The ions 6 therefore reach radii at which the ions 6 have a higher adiabaticity parameter and pick up some kinetic energy from the AC/RF electric field. However, the ions 6 do not pick up sufficient energy to become unstable in the ion guide 1 and hence do not hit the outer electrode 2. Accordingly, all the ions 4, 5, 6 are transmitted to the exit 10 of the ion guide 1.

Figure 10:
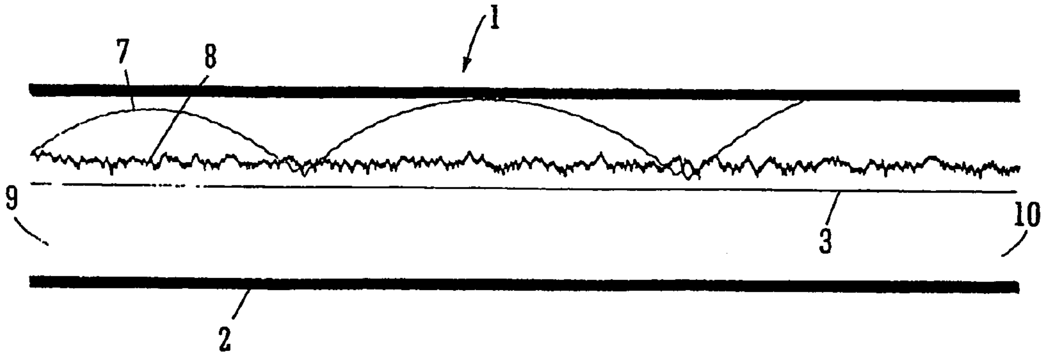
FIG. 10 shows an ion simulation illustrating the ion motion in a guide wire ion guide for ions having identical mass to charge ratios of 1000 both with and without the presence of nitrogen gas at a pressure of 1 mbar wherein the ions have initial kinetic energies of 8 eV and are released at a distance of 1.45 mm from the central axis and at an angle of 45° relative to the guide wire.

FIG. 10 shows a simulation for the ion motion through an ion guide 1 for two ions 7, 8 having a mass to charge ratio of 1000, initial kinetic energies of 8 eV and wherein the ions are released at a distance of 1.45 mm from the central axis and at an angle of 45° relative to the guide wire 3. The outer cylindrical electrode 2 and guide wire 3 are maintained at 0 V and −30 V DC respectively. The outer electrode 2 and the guide wire 3 are also connected to an RF voltage supply of 900 V having a frequency of 11 rad/μs (AC frequency of 1.75 MHz). In this simulation an additional axial electric field of 0.1 V/mm was maintained along the length of the ion guide 1.

Ions 7 which enter the ion guide 1 at an angle of 45° relative to the guide wire 3 when no gas is present in the ion guide 1 travel to a radius which is relatively close to the guide wire 3 and pick up radial kinetic energy from the AC/RF electric field. This extra kinetic energy eventually causes the ions 7 to collide with the outer electrode 2 such that they are neutralised and not transmitted by the ion guide 1.

If a cooling gas is present or introduced into the ion guide 1, then as shown in FIG. 10, the ions 8 take a quite different path through the ion guide 1. FIG. 10 shows a simulation of the path of ions 8 through the ion guide 1 when nitrogen gas is present at a pressure of 1 mbar. Collisions between the ions 8 and the gas molecules help to reduce the kinetic energy imparted to the ions 8 when they travel relatively close to the guide wire 3. Therefore, the presence of the cooling gas prevents the ions 8 from gaining excessive radial kinetic from the AC/RF electric fields and as such the ions 8 are prevented from becoming unstable and leaving the pseudo-potential well.

The gas introduced into the ion guide 1 may eventually reduce the axial energy of the ions to the thermal energy of the gas. Therefore, an additional axial electric field may be applied to maintain ion motion in the axial direction. The axial electric field may be achieved by dividing the outer electrode 2 into a series of concentric cylindrical electrodes and maintaining DC potential differences between the cylindrical electrodes such that an axial DC voltage gradient is maintained over at least a portion of the length of the ion guide 1. In a further embodiment, travelling potential wave functions may be applied to the elements of the outer segmented electrode 2 in order to assist in ion transmission through the ion guide 1.

In one embodiment the guide wire 3 may comprise a semiconductor or resistive wire such that an axial DC electric field may be generated when a DC potential difference is maintained across the guide wire 3. The guide wire 3 may also be formed of two or more sections, each section having different AC/RF and/or DC voltages applied thereto.

The ion guide 1 may be formed in any shape. For example, the ion guide 1 may be bent in a circle or other shape to guide ions around corners. In an embodiment the guide wire 3 and/or outer electrode(s) 2 may be Y-shaped or otherwise arranged so as to split or join packets or beams of ions.

Although the outer electrode 2 and inner electrode 3 have been described according to the preferred embodiment as being cylindrical electrodes and wires it is also contemplated that according to less preferred embodiments the outer electrode may comprise a rod set or segmented rod set and/or the inner electrode may comprise a cylindrical or rod electrode.

In another embodiment the entrance 9 and/or exit 10 of the ion guide 1 may be arranged at a higher or lower potential so that ions approaching the entrance 9 and/or exit 10 of the ion guide 1 are reflected and may be trapped or stored within the ion guide 1. These regions of higher or lower potential may be generated by additional DC and/or AC/RF voltages being applied to one or more ring lenses, plates or grids arranged substantially at the entrance 9 and/or exit 10 of the ion guide 1.

Although the present invention has been described with reference to preferred embodiments, it will be understood by those skilled in the art that various changes in form and detail may be made without departing from the scope of the invention as set forth in the accompanying claims.

The invention claimed is:

1. A mass spectrometer comprising an ion guide, said ion guide comprising an outer electrode and an inner electrode disposed within said outer electrode, wherein in use said inner and outer electrodes are maintained at a DC potential difference such that ions experience a first radial force towards said inner electrode and wherein in use an AC or RF voltage is applied to said inner and/or said outer electrodes so that ions experience a second radial force towards said outer electrode.

2. A mass spectrometer as claimed in claim 1, wherein said AC or RF voltage is a single phase AC or RF voltage applied to said inner electrode.

3. A mass spectrometer as claimed in claim 1, wherein said AC or RF voltage is a single phase AC or RF voltage applied to said outer electrode.

4. A mass spectrometer as claimed in claim 1, wherein said AC or RF voltage is a two phase AC or RF voltage and wherein a first phase is applied to said inner electrode and a second phase is applied to said outer electrode.

5. A mass spectrometer as claimed in claim 1, wherein said AC or RF voltage has a frequency selected from the group consisting of: (i)<100 kHz; (ii) 100-200 kHz; (iii) 200-300 kHz; (iv) 300-400 kHz; (v) 400-500 kHz; (vi) 0.5-1.0 MHz; (vii) 1.0-1.5 MHz; (viii) 1.5-2.0 MHz; (ix) 2.0-2.5 MHz; (x) 2.5-3.0 MHz; (xi) 3.0-3.5 MHz; (xii) 3.5-4.0 MHz; (xiii) 4.0-4.5 MHz; (xiv) 4.5-5.0 MHz; (xv) 5.0-5.5 MHz; (xvi) 5.5-6.0 MHz; (xvii) 6.0-6.5 MHz; (xviii) 6.5-7.0 MHz; (xix) 7.0-7.5 MHz; (xx) 7.5-8.0 MHz; (xxi) 8.0-8.5 MHz; (xxii) 8.5-9.0 MHz; (xxiii) 9.0-9.5 MHz; (xxiv) 9.5-10.0 MHz; and (xxv)>10.0 MHz.

6. A mass spectrometer as claimed in claim 1, wherein the amplitude of said AC or RF voltage is selected from the group consisting of: (i)<50 V peak to peak; (ii) 50-100 V peak to peak; (iii) 100-150 V peak to peak; (iv) 150-200 V peak to peak; (v) 200-300 V peak to peak; (vi) 300-400 V peak to peak; (vii) 400-500 V peak to peak; (viii) 500-600 V peak to peak; (ix) 600-700 V peak to peak; (x) 700-800 V peak to peak; (xi) 800-900 V peak to peak; (xii) 900-1000 V peak to peak; (xiii) 1000-1100 V peak to peak; (xiv) 1100-1200 V peak to peak; (xv) 1200-1300 V peak to peak; (xvi) 1300-1400 V peak to peak; (xvii) 1400-1500 V peak to peak; and (xviii)>1500 V peak to peak.

7. A mass spectrometer as claimed in claim 1, wherein said outer electrode is maintained, in use, at a DC potential selected from the group consisting of: (i)<−500 V; (ii) −500 to −400 V; (iii) −400 to −300 V; (iv) −300 to −200 V; (v) −200 to −100 V; (vi) −100 to −75 V; (vii) −75 to −50 V; (viii) −50 to −25 V; (ix) −25 to 0V; (x) 0V; (xi) 0-25 V; (xii) 25-50 V; (xiii) 50-75 V; (xiv) 75-100 V; (xv) 100-200 V; (xvi) 200-300 V; (xvii) 300-400 V; (xviii) 400-500 V; (xix)>500 V.

8. A mass spectrometer as claimed in claim 1, wherein said inner electrode is maintained, in use, at a DC potential selected from the group consisting of: (i) <−500 V; (ii) −500 to −400 V; (iii) −400 to −300 V; (iv) −300 to −200 V; (v) −200 to −100 V; (vi) −100 to −75 V; (vii) −75 to −50 V; (viii) −50 to −25 V; (ix) −25 to 0V; (x) 0V; (xi) 0-25 V; (xii) 25-50 V; (xiii) 50-75 V; (xiv) 75-100 V; (xv) 100-200 V; (xvi) 200-300 V; (xvii) 300-400 V; (xviii) 400-500 V; (xix)>500 V.

9. A mass spectrometer as claimed in claim 1, wherein said outer electrode is maintained at a DC potential which is more positive than the DC potential at which said inner electrode is maintained, in use, by a potential difference selected from the group consisting of: (i) 0.1-5 V; (ii) 5-10 V; (iii) 10-15 V; (iv) 15-20 V; (v) 20-25 V; (vi) 25-30 V; (vii) 30-40 V; (viii) 40-50 V; and (ix)>50 V.

10. A mass spectrometer as claimed in claim 1, wherein said outer electrode is maintained at a DC potential which is more negative than the DC potential at which said inner electrode is maintained, in use, by a potential difference selected from the group consisting of: (i) 0.1-5 V; (ii) 5-10 V; (iii) 10-15 V; (iv) 15-20 V; (v) 20-25 V; (vi) 25-30 V; (vii) 30-40 V; (viii) 40-50 V; and (ix)>50 V.

11. A mass spectrometer as claimed in claim 1, wherein said inner electrode comprises a guide wire.

12. A mass spectrometer as claimed in claim 1, wherein at least 10%, 20%, 30%, 40%, 50%, 60%, 70%, 80%, 90%, 95% or 100% of said inner electrode comprises a semiconductor or resistive wire and wherein, in use, an axial DC potential gradient is maintained along at least 10%, 20%, 30%, 40%, 50%, 60%, 70%, 80%, 90%, 95% or 100% of said inner electrode by applying a DC potential difference across 10%, 20%, 30%, 40%, 50%, 60%, 70%, 80%, 90%, 95% or 100% of said inner electrode.

13. A mass spectrometer as claimed in claim 1, wherein said inner electrode comprises a cylindrical electrode.

14. A mass spectrometer as claimed in claim 13, wherein said inner electrode comprises a plurality of concentric cylindrical electrodes.

15. A mass spectrometer as claimed in claim 14, wherein, in use, an axial DC potential gradient is maintained along at least 10%, 20%, 30%, 40%, 50%, 60%, 70%, 80%, 90%, 95% or 100% of said inner electrode by maintaining at least some of said plurality of concentric cylindrical electrodes at different DC potentials.

16. A mass spectrometer as claimed in claim 1, wherein said inner electrode comprises a plurality of electrodes.

17. A mass spectrometer as claimed in claim 16, wherein in a mode of operation an axial DC potential gradient is maintained along at least 10%, 20%, 30%, 40%, 50%, 60%, 70%, 80%, 90%, 95% or 100% of the length of said inner electrode so that ions are urged along at least a portion of said ion guide.

18. A mass spectrometer as claimed in claim 17, wherein said axial DC potential gradient is maintained substantially constant with time as ions pass along said ion guide.

19. A mass spectrometer as claimed in claim 17, wherein said axial DC potential gradient varies with time as ions pass along said ion guide.

20. A mass spectrometer as claimed in claim 1, wherein said outer electrode comprises a plurality of electrodes.

21. A mass spectrometer as claimed in claim 20, wherein in a mode of operation an axial DC potential gradient is maintained along at least 10%, 20%, 30%, 40%, 50%, 60%, 70%, 80%, 90%, 95% or 100% of the length of said outer electrode so that ions are urged along at least a portion of said ion guide.

22. A mass spectrometer as claimed in claim 21, wherein said axial DC potential gradient is maintained substantially constant with time as ions pass along said ion guide.

23. A mass spectrometer as claimed in claim 21, wherein said axial DC potential gradient varies with time as ions pass along said ion guide.

24. A mass spectrometer as claimed in claim 1, wherein said ion guide comprises 3, 4, 5, 6, 7, 8, 9, 10, 11, 12, 13, 14, 15, 16, 17, 18, 19, 20, 21, 22, 23, 24, 25, 26, 27, 28, 29, 30 or >30 segments, wherein each segment comprises 1, 2, 3, 4, 5, 6, 7, 8, 9, 10, 11, 12, 13, 14, 15, 16, 17, 18, 19, 20, 21, 22, 23, 24, 25, 26, 27, 28, 29, 30 or >30 electrodes and wherein the electrodes in a segment are maintained at substantially the same DC potential.

25. A mass spectrometer as claimed in claim 24, wherein a plurality of segments are maintained at substantially the same DC potential.

26. A mass spectrometer as claimed in claim 24, wherein each segment is maintained at substantially the same DC potential as the subsequent nth segment wherein n is 3, 4, 5, 6, 7, 8, 9, 10, 11, 12, 13, 14, 15, 16, 17, 18, 19, 20, 21, 22, 23, 24, 25, 26, 27, 28, 29, 30 or >30.

27. A mass spectrometer as claimed in claim 1, wherein ions are constrained axially within said ion guide by a real potential barrier or well.

28. A mass spectrometer as claimed in claim 1, wherein the transit time of ions through said ion guide is selected from the group consisting of: (i) less than or equal to 20 ms; (ii) less than or equal to 10 ms; (iii) less than or equal to 5 ms; (iv) less than or equal to 1 ms; and (v) less than or equal to 0.5 ms.

29. A mass spectrometer as claimed in claim 1, wherein in use one or more transient DC voltages or one or more transient DC voltage waveforms are initially provided at a first axial position and are then subsequently provided at second, then third different axial positions along said ion guide.

30. A mass spectrometer as claimed in claim 1, wherein in use one or more transient DC voltages or one or more transient DC voltage waveforms move in use from one end of said ion guide to another end of said ion guide so that ions are urged along said ion guide.

31. A mass spectrometer as claimed in claim 29, wherein said one or more transient DC voltages create: (i) a potential hill or barrier; (ii) a potential well; (iii) multiple potential hills or barriers; (iv) multiple potential wells; (v) a combination of a potential hill or barrier and a potential well; or (vi) a combination of multiple potential hills or barriers and multiple potential wells.

32. A mass spectrometer as claimed in claim 29, wherein said one or more transient DC voltage waveforms comprise a repeating waveform.

33. A mass spectrometer as claimed in claim 32, wherein said one or more transient DC voltage waveforms comprise a square wave.

34. A mass spectrometer as claimed in claim 29, wherein the amplitude of said one or more transient DC voltages or said one or more transient DC voltage waveforms remains substantially constant with time.

35. A mass spectrometer as claimed in claim 29, wherein the amplitude of said one or more transient DC voltages or said one or more transient DC voltage waveforms varies with time.

36. A mass spectrometer as claimed in claim 35, wherein the amplitude of said one or more transient DC voltages or said one or more transient DC voltage waveforms either: (i) increases with time; (ii) increases then decreases with time; (iii) decreases with time; or (iv) decreases then increases with time.

37. A mass spectrometer as claimed in claim 29, wherein said ion guide comprises an upstream entrance region, a downstream exit region and an intermediate region, wherein:

in said entrance region the amplitude of said one or more transient DC voltages or said one or more transient DC voltage waveforms has a first amplitude;

in said intermediate region the amplitude of said one or more transient DC voltages or said one or more transient DC voltage waveforms has a second amplitude; and in said exit region the amplitude of said one or more transient DC voltages or said one or more transient DC voltage waveforms has a third amplitude.

38. A mass spectrometer as claimed in claim 37, wherein the entrance and/or exit region comprise a proportion of the total axial length of said ion guide selected from the group consisting of: (i)<5%; (ii) 5-10%; (iii) 10-15%; (iv) 15-20%; (v) 20-25%; (vi) 25-30%; (vii) 30-35%; (viii) 35-40%; and (ix) 40-45%.

39. A mass spectrometer as claimed in claim 37, wherein said first and/or third amplitudes are substantially zero and said second amplitude is substantially non-zero.

40. A mass spectrometer as claimed in claim 37, wherein said second amplitude is larger than said first amplitude and/or said second amplitude is larger than said third amplitude.

41. A mass spectrometer as claimed in claim 1, wherein one or more transient DC voltages or one or more transient DC voltage waveforms pass in use along said ion guide with a first velocity.

42. A mass spectrometer as claimed in claim 41, wherein said first velocity: (i) remains substantially constant; (ii) varies; (iii) increases; (iv) increases then decreases; (v) decreases; (vi) decreases then increases; (vii) reduces to substantially zero; (viii) reverses direction; or (ix) reduces to substantially zero and then reverses direction.

43. A mass spectrometer as claimed in claim 41, wherein said one or more transient DC voltages or said one or more transient DC voltage waveforms causes ions within said ion guide to pass along said ion guide with a second velocity.

44. A mass spectrometer as claimed in claim 43, wherein the difference between said first velocity and said second velocity is less than or equal to 100 m/s, 90 m/s, 80 m/s, 70 m/s, 60 m/s, 50 m/s, 40 m/s, 30 m/s, 20 m/s, 10 m/s, 5 m/s or 1 m/s.

45. A mass spectrometer as claimed in claim 41, wherein said first velocity is selected from the group consisting of: (i) 10-250 m/s; (ii) 250-500 m/s; (iii) 500-750 m/s; (iv) 750-1000 m/s; (v) 1000-1250 m/s; (vi) 1250-1500 m/s; (vii) 1500-1750 m/s; (viii) 1750-2000 m/s; (ix) 2000-2250 m/s; (x) 2250-2500 m/s; (xi) 2500-2750 m/s; and (xii) 2750-3000 m/s.

46. A mass spectrometer as claimed in claim 43, wherein said second velocity is selected from the group consisting of: (i) 10-250 m/s; (ii) 250-500 m/s; (iii) 500-750 m/s; (iv) 750-1000 m/s; (v) 1000-1250 m/s; (vi) 1250-1500 m/s; (vii) 1500-1750 m/s; (viii) 1750-2000 m/s; (ix) 2000-2250 m/s; (x) 2250-2500 m/s; (xi) 2500-2750 m/s; and (xii) 2750-3000 m/s.

47. A mass spectrometer as claimed in claim 43, wherein said second velocity is substantially the same as said first velocity.

48. A mass spectrometer as claimed in claim 29, wherein said one or more transient DC voltages or said one or more transient DC voltage waveforms has a frequency, and wherein said frequency: (i) remains substantially constant; (ii) varies; (iii) increases; (iv) increases then decreases; (v) decreases; or (vi) decreases then increases.

49. A mass spectrometer as claimed in claim 29, wherein said one or more transient DC voltages or said one or more transient DC voltage waveforms has a wavelength, and wherein said wavelength: (i) remains substantially constant; (ii) varies; (iii) increases; (iv) increases then decreases; (v) decreases; or (vi) decreases then increases.

50. A mass spectrometer as claimed in claim 1, wherein two or more transient DC voltages or two or more transient DC voltage waveforms pass simultaneously along said ion guide.

51. A mass spectrometer as claimed in claim 50, wherein said two or more transient DC voltages or said two or more transient DC voltage waveforms are arranged to move: (i) in the same direction; (ii) in opposite directions; (iii) towards each other; or (iv) away from each other.

52. A mass spectrometer as claimed in claim 1, wherein one or more transient DC voltages or one or more transient DC voltage waveforms are repeatedly generated and passed in use along said ion guide, and wherein the frequency of generating said one or more transient DC voltages or said one or more transient DC voltage waveforms: (i) remains substantially constant; (ii) varies; (iii) increases; (iv) increases then decreases; (v) decreases; or (vi) decreases then increases.

53. A mass spectrometer as claimed in claim 1, further comprising an ion detector, said ion detector being arranged to be substantially phase locked in use with pulses of ions emerging from the exit of said ion guide.

54. A mass spectrometer as claimed in claim 1, further comprising a Time of Flight mass analyser comprising an electrode for injecting ions into a drift or flight region, said electrode being arranged to be energised in use in a substantially synchronised manner with the pulses of ions emerging from the exit of said ion guide.

55. A mass spectrometer as claimed in claim 1, further comprising an ion trap arranged downstream of said ion guide, said ion trap being arranged to store and/or release ions from said ion trap in a substantially synchronised manner with pulses of ions emerging from the exit of said ion guide.

56. A mass spectrometer as claimed in claim 1, further comprising a mass filter arranged downstream of said ion guide, wherein a mass to charge ratio transmission window of said mass filter is varied in a substantially synchronised manner with pulses of ions emerging from the exit of said ion guide.

57. A mass spectrometer as claimed in claim 1, wherein said ion guide comprises one, two, or more than two entrances for receiving ions and one, two, or more than two exits from which ions emerge from said ion guide.

58. A mass spectrometer as claimed in claim 1, wherein said inner electrode is substantially Y-shaped.

59. A mass spectrometer as claimed in claim 1, wherein said outer electrode is substantially Y-shaped.

60. A mass spectrometer as claimed in claim 1, wherein said ion guide comprises at least one entrance for receiving ions along a first axis and at least one exit from which ions emerge from said ion guide along a second axis, wherein said outer electrode and/or said inner electrode are curved between said entrance and said exit.

61. A mass spectrometer as claimed in claim 60, wherein said ion guide is substantially "S"-shaped and/or has a single point of inflexion.

62. A mass spectrometer as claimed in claim 60, wherein said second axis is laterally displaced from said first axis.

63. A mass spectrometer as claimed in claim 1, wherein said ion guide comprises at least one entrance for receiving ions along a first axis and at least one exit from which ions emerge from said ion guide along a second axis, wherein said second axis is inclined at an angle θ to said first axis and wherein θ>0°.

64. A mass spectrometer as claimed in claim 63, wherein θ falls within the range: (i)<10°; (ii) 10-20°; (iii) 20-30°; (iv) 30-40°; (v) 40-50°; (vi) 50-60°; (vii) 60-70°; (viii) 70-80°; (ix) 80-90°; (x) 90-100°; (xi) 100-110°; (xii) 110-120°; (xiii) 120-130°; (xiv) 130-140°; (xv) 140-150°; (xvi) 150-160°; (xvii) 160-170°; and (xviii) 170-180°.

65. A mass spectrometer as claimed in claim 1, wherein at least a portion of said ion guide either: (i) varies in size and/or shape along the length of said ion guide; or (ii) has a width and/or height which progressively tapers in size.

66. A mass spectrometer as claimed in claim 1, wherein said inner electrode is arranged offset from the central axis of said outer electrode.

67. A mass spectrometer as claimed in claim 1, wherein the distance between said inner electrode and said outer electrode varies along at least a portion of said ion guide.

68. A mass spectrometer as claimed in claim 1, further comprising an ion source, said ion source being selected from the group consisting of: (i) an Electrospray ("ESI") ion source; (ii) an Atmospheric Pressure Chemical Ionisation ("APCI") ion source; (iii) an Atmospheric Pressure Photo Ionisation ("APPI") ion source; (iv) a Matrix Assisted Laser Desorption Ionisation ("MALDI") ion source; (v) a Laser Desorption Ionisation ("LDI") ion source; (vi) an Inductively Coupled Plasma ("ICP") ion source; (vii) an Electron Impact ("EI") ion source; (viii) a Chemical Ionisation ("CI") ion source; (ix) a Fast Atom Bombardment ("FAB") ion source; and (x) a Liquid Secondary Ions Mass Spectrometry ("LSIMS") ion source.

69. A mass spectrometer as claimed in claim 1, further comprising a pulsed ion source.

70. A mass spectrometer as claimed in claim 1, further comprising a continuous ion source.

71. A mass spectrometer as claimed in claim 1, said ion guide having an entrance for receiving ions and an exit from which ions are released, wherein said entrance and/or exit of the ion guide are maintained at a potential so that ions are reflected at said entrance and/or exit.

72. A mass spectrometer as claimed in claim 71, further comprising at least one ring lens, plate electrode or grid electrode arranged at said entrance and/or exit of said ion guide and wherein said at least one ring lens, plate electrode or grid electrode is arranged to be maintained at a potential so that ions are reflected at said entrance and/or exit.

73. A mass spectrometer as claimed in claim 72, wherein an AC or RF voltage and/or a DC voltage is supplied to said at least one ring lens, plate electrode or grid electrode so that ions are reflected at said entrance and/or exit.

74. A mass spectrometer as claimed in claim 1, further comprising a mass analyser arranged downstream of said ion guide, said mass analyser selected from the group consisting of: (i) a Time of Flight mass analyser; (ii) a quadrupole mass analyser; (iii) a Fourier Transform Ion Cyclotron Resonance ("FTICR") mass analyser; (iv) a 2D (linear) quadrupole ion trap; (v) a 3D (Paul) quadrupole ion trap; and (vi) a magnetic sector mass analyser.

75. A mass spectrometer as claimed in claim 1, wherein in a mode of operation said ion guide is maintained in use at a pressure selected from the group consisting of: (i) greater than or equal to 0.0001 mbar; (ii) greater than or equal to 0.0005 mbar; (iii) greater than or equal to 0.001 mbar; (iv) greater than or equal to 0.005 mbar; (v) greater than or equal to 0.01 mbar; (vi) greater than or equal to 0.05 mbar; (vii) greater than or equal to 0.1 mbar; (viii) greater than or equal to 0.5 mbar; (ix) greater than or equal to 1 mbar; (x) greater than or equal to 5 mbar; and (xi) greater than or equal to 10 mbar.

76. A mass spectrometer as claimed in claim 1, wherein in a mode of operation said ion guide is maintained in use at a pressure selected from the group consisting of: (i) less than or equal to 10 mbar; (ii) less than or equal to 5 mbar; (iii) less than or equal to 1 mbar; (iv) less than or equal to 0.5 mbar; (v) less than or equal to 0.1 mbar; (vi) less than or equal to 0.05 mbar; (vii) less than or equal to 0.01 mbar; (viii) less than or equal to 0.005 mbar; (ix) less than or equal to 0.001 mbar; (x) less than or equal to 0.0005 mbar; and (xi) less than or equal to 0.0001 mbar.

77. A mass spectrometer as claimed in claim 1, wherein in a mode of operation said ion guide is maintained in use at a pressure selected from the group consisting of: (i) between 0.0001 and 10 mbar; (ii) between 0.0001 and 1 mbar; (iii) between 0.0001 and 0.1 mbar; (iv) between 0.0001 and 0.01 mbar; (v) between 0.0001 and 0.001 mbar; (vi) between 0.001 and 10 mbar; (vii) between 0.001 and 1 mbar; (viii) between 0.001 and 0.1 mbar; (ix) between 0.001 and 0.01 mbar; (x) between 0.01 and 10 mbar; (xi) between 0.01 and 1 mbar; (xii) between 0.01 and 0.1 mbar; (xiii) between 0.1 and 10 mbar; (xiv) between 0.1 and 1 mbar; and (xv) between 1 and 10 mbar.

78. A mass spectrometer as claimed in claim 1, wherein a mode of operation said ion guide is maintained in use at a pressure selected from the group consisting of: (i) greater than or equal to $1\times10^{-7}$ mbar; (ii) greater than or equal to $5\times10^{-7}$ mbar; (iii) greater than or equal to $1\times10^{-6}$ mbar; (iv) greater than or equal to $5\times10^{-6}$ mbar; (v) greater than or equal to $1\times10^{-5}$ mbar; and (vi) greater than or equal to $5\times10^{-5}$ mbar.

79. A mass spectrometer as claimed in claim 1, wherein in a mode of operation said ion guide is maintained in use at a pressure selected from the group consisting of: (i) less than or equal to $1\times10^{-4}$ mbar; (ii) less than or equal to $5\times10^{-5}$ mbar; (iii) less than or equal to $1\times10^{-5}$ mbar; (iv) less than or equal to $5\times10^{-6}$ mbar; (v) less than or equal to $1\times10^{-6}$ mbar; (vi) less than or equal to $5\times10^{-7}$ mbar; and (vii) less than or equal to $1\times10^{-7}$ mbar.

80. A mass spectrometer as claimed in claim 1, wherein in a mode of operation said ion guide is maintained, in use, at a pressure selected from the group consisting of: (i) between $1\times10^{-7}$ and $1\times10^{-4}$ mbar; (ii) between $1\times10^{-7}$ and $5\times10^{-5}$ mbar; (iii) between $1\times10^{-7}$ and $1\times10^{-5}$ mbar; (iv) between $1\times10^{-7}$ and $5\times10^{-6}$ mbar; (v) between $1\times10^{-7}$ and $1\times10^{-6}$ mbar; (vi) between $1\times10^{-7}$ and $5\times10^{-7}$ mbar; (vii) between $5\times10^{-7}$ and $1\times10^{-4}$ mbar; (viii) between $5\times10^{-7}$ and $5\times10^{-5}$ mbar; (ix) between $5\times10^{-7}$ and $1\times10^{-5}$ mbar; (x) between $5\times10^{-7}$ and $5\times10^{-6}$ mbar; (xi) between $5\times10^{-7}$ and $1\times10^{-6}$ mbar; (xii) between $1\times10^{-6}$ mbar and $1\times10^{-4}$ mbar; (xiii) between $1\times10^{-6}$ and $5\times10^{-5}$ mbar; (xiv) between $1\times10^{-6}$ and $1\times10^{-5}$ mbar; (xv) between $1\times10^{-6}$ and $5\times10^{-6}$ mbar; (xvi) between $5\times10^{-6}$ mbar and $1\times10^{-4}$ mbar; (xvii) between $5\times10^{-6}$ and $5\times10^{-5}$ mbar; (xviii) between $5\times10^{-6}$ and $1\times10^{-5}$ mbar; (xix) between $1\times10^{-5}$ mbar and $1\times10^{-4}$ mbar; (xx) between $1\times10^{-5}$ and $5\times10^{-5}$ mbar; and (xxi) between $5\times10^{-5}$ and $1\times10^{-4}$ mbar.

81. A mass spectrometer comprising an ion guide, said ion guide comprising a guide wire, cylindrical or rod electrode and an outer cylindrical electrode wherein, in use, both an AC and a DC potential difference is maintained between said guide wire, cylindrical or rod electrode and said outer cylindrical electrode.

82. A method of mass spectrometry, comprising:

guiding ions along an ion guide comprising an outer electrode and an inner electrode disposed within said outer electrode;

maintaining said inner and outer electrodes at a DC potential difference such that ions experience a first radial force towards said inner electrode; and applying an AC or RF voltage to said inner and/or said outer electrodes so that ions experience a second radial force towards said outer electrode.

83. A mass spectrometer comprising:

an ion guide comprising a guide wire held centrally in an electrically conductive cylindrical tube electrode wherein both AC and DC voltages are applied, in use, between the guide wire and the cylindrical tube electrode in order to radially retain ions whilst said ions are being transported axially through said ion guide.

84. A mass spectrometer as claimed in claim 83, wherein said guide wire comprises a semiconductor or resistive wire so that an axial DC field is maintained, in use, along said ion guide by the application of a DC voltage between the ends of said guide wire.

85. A mass spectrometer comprising:

an ion guide comprising a guide wire held centrally in a plurality of outer concentric cylindrical electrodes wherein both AC and DC voltages are applied, in use, between the guide wire and the plurality of outer concentric cylindrical electrodes in order to radially retain ions whilst said ions are being transported axially through said ion guide.

86. A mass spectrometer as claimed in claim 85, wherein an axial DC field is maintained, in use, along said ion guide by the application of DC voltages to said plurality of outer cylindrical electrodes.

87. A mass spectrometer as claimed in claim 85, wherein travelling potential wave functions are applied, in use, to said outer cylindrical electrodes to assist in ion transmission.

88. A mass spectrometer comprising:

an ion guide comprising a guide wire held centrally in an electrically conductive cylindrical tube electrode wherein both AC and DC voltages are applied, in use, between the guide wire and the cylindrical tube electrode and wherein ions are arranged, in use, to impact the inside wall of said cylindrical tube electrode or the guide wire to produce secondary ion disassociation by adjusting the AC or DC voltages.

89. A mass spectrometer comprising:

an ion guide comprising a guide wire held centrally in an electrically conductive cylindrical tube electrode wherein both AC and DC voltages are applied, in use, between the guide wire and the cylindrical tube electrode and wherein said AC voltage or said DC voltage is adjusted so as to cause an increase in the internal energy of ions within said ion guide thereby inducing collisional fragmentation or collisional induced disassociation of said ions.

90. A mass spectrometer comprising:

an ion guide comprising an inner cylindrical electrode held centrally in an electrically conductive cylindrical tube electrode wherein both AC and DC voltages are applied, in use, between the inner cylindrical electrode and the cylindrical tube electrode in order to radially retain ions whilst said ions are being transported axially through said ion guide.

91. A mass spectrometer comprising:

an ion guide comprising a guide wire held centrally in an electrically conductive cylindrical tube electrode wherein both AC and DC voltages are applied, in use, between the guide wire and the cylindrical tube electrode in order to radially retain ions whilst said ions are being transported axially through said ion guide and wherein said guide wire splits into two or more wires.

92. A mass spectrometer as claimed in claim 91, wherein different AC or DC voltages are applied to said two or more wires.

93. A mass spectrometer comprising:

an ion guide comprising a guide wire held centrally in an electrically conductive cylindrical tube electrode wherein both AC and DC voltages are applied, in use, between the guide wire and the cylindrical tube electrode in order to radially retain ions whilst said ions are being transported axially through said ion guide and wherein said guide wire is not straight.

94. A mass spectrometer as claimed in claim 93, wherein said guide wire is circular.

95. A mass spectrometer comprising an ion guide, said ion guide comprising a Y-shaped outer cylindrical electrode and a Y-shaped inner guide wire electrode, wherein in use said outer electrode and said inner electrode are supplied with both an AC voltage and a DC voltage and wherein said ion guide is arranged so that an ion beam is split or ion beams are joined.

96. A mass spectrometer comprising:

an ion guide comprising a guide wire held centrally in an electrically conductive cylindrical tube electrode wherein both AC and DC voltages are applied, in use, between the guide wire and the cylindrical tube electrode in order to radially retain ions whilst said ions are being transported axially through said ion guide, said ion guide further comprising a ring lens, plate or grid and wherein an additional DC or AC voltage is applied, in use, to said ring lens, plate or grid so that ions are reflected backwards and are trapped or stored within said ion guide.

* * * * *